United States Patent
Kondepudy et al.

(10) Patent No.: US 8,767,734 B1
(45) Date of Patent: Jul. 1, 2014

(54) STREAM BASIS SET DIVISION MULTIPLEXING

(75) Inventors: Raghava Kondepudy, San Jose, CA (US); Saibal Banerjee, Fremont, CA (US); Gano Broto Chatterji, Sunnyvale, CA (US)

(73) Assignee: BCK Networks, Inc., Fremont, CA (US)

( * ) Notice: Subject to any disclaimer, the term of this patent is extended or adjusted under 35 U.S.C. 154(b) by 549 days.

(21) Appl. No.: 12/587,367

(22) Filed: Oct. 5, 2009

Related U.S. Application Data

(60) Provisional application No. 61/195,346, filed on Oct. 7, 2008.

(51) Int. Cl.
*H04L 12/28* (2006.01)
(52) U.S. Cl.
USPC ............ 370/392; 370/400; 709/220; 709/238
(58) Field of Classification Search
None
See application file for complete search history.

(56) References Cited

U.S. PATENT DOCUMENTS

| | | | |
|---|---|---|---|
| 6,192,051 B1 * | 2/2001 | Lipman et al. ................ | 370/389 |
| 6,347,078 B1 * | 2/2002 | Narvaez-Guarnieri et al. ............................ | 370/230 |
| 6,400,681 B1 * | 6/2002 | Bertin et al. ................... | 370/218 |
| 6,584,500 B1 * | 6/2003 | Arkko ............................ | 709/223 |
| 6,658,481 B1 * | 12/2003 | Basso et al. ................... | 709/243 |
| 6,721,800 B1 * | 4/2004 | Basso et al. ................... | 709/239 |
| 7,111,074 B2 * | 9/2006 | Basturk ......................... | 709/241 |
| 7,346,706 B2 * | 3/2008 | Rezaaifar et al. ............. | 709/239 |
| 7,362,744 B2 * | 4/2008 | Basso et al. ................... | 370/351 |
| 7,366,100 B2 * | 4/2008 | Anderson et al. ............. | 370/237 |
| 7,693,064 B2 * | 4/2010 | Thubert et al. ................ | 370/235 |
| 8,098,578 B1 * | 1/2012 | Shah et al. .................... | 370/230 |
| 2004/0073715 A1 * | 4/2004 | Folkes et al. .................. | 709/250 |
| 2005/0071469 A1 * | 3/2005 | McCollom et al. ........... | 709/225 |

* cited by examiner

*Primary Examiner* — Brian Roberts
(74) *Attorney, Agent, or Firm* — T. Lester Wallace; Kelsey M. Stout; Amir V. Adibi

(57) ABSTRACT

A source-address independent, multi-path routing method for use in a communication network is disclosed. A network node uses an information packet's destination address to determine a plurality of neighbors it has a proportional likelihood to forward that packet to, such that packets can be sent over multiple paths to a destination node without undesirable looping. Multiple-neighbor proportional forwarding routing tables are determined by computing a directed graph of multiple optimal paths to each destination node. Optimal paths and forwarding proportions are based on link capacities. The multi-path routing method provides maximized throughput, reduced congestion and superior load balancing over single-path routing. Source-address independence also overcomes a major problem of more traditional source-address dependent multi-path routing methods. The source-address independent, multi-path routing method can be implemented in mixed networks where some nodes do not implement the method. Data structures and methods for determining the optimal paths and parameters are provided.

21 Claims, 20 Drawing Sheets

ILLUSTRATIVE CASE FOR *GetFlow* METHOD

EXAMPLE FDAG ROOTED AT NODE H

EXPLODED VIEW OF FORWARDING LINKS WITH PROPORTIONS

| FROM NODE | TO NODE | PROPORTION |
|---|---|---|
| A | B | 0.2 |
| B | A | 0.0 |
| A | C | 0.8 |
| C | A | 0.0 |
| B | D | 0.3 |
| D | B | 0.0 |
| B | F | 0.7 |
| F | B | 0.0 |
| C | D | 0.5 |
| D | C | 0.0 |
| C | G | 0.5 |
| G | C | 0.0 |
| D | E | 1.0 |
| E | D | 0.0 |
| E | F | 0.6 |
| F | E | 0.0 |
| E | G | 0.4 |
| G | E | 0.0 |
| F | H | 1.0 |
| H | F | 0.0 |
| G | H | 1.0 |
| H | G | 0.0 |

FIG. 7B

MNPF ROUTING TABLE FOR NODE E

| DEST. NODE | # NEXT HOPS | FORWARD TO, PROPORTION | | |
|---|---|---|---|---|
| A | 1 | D, 1.00 | - | - |
| B | 1 | D, 1.00 | - | - |
| C | 1 | D, 1.00 | - | - |
| D | 1 | D, 1.00 | - | - |
| E | - | - | - | - |
| F | 1 | F, 1.00 | - | - |
| G | 1 | G, 1.00 | - | - |
| H | 2 | F, 0.60 | G, 0.40 | - |

FIG. 10

MNPF ROUTING TABLE FOR NODE F

| DEST. NODE | # NEXT HOPS | FORWARD TO, PROPORTION | | |
|---|---|---|---|---|
| A | 2 | B, 0.90 | E, 0.10 | - |
| B | 1 | B, 1.00 | - | - |
| C | 2 | E, 0.70 | B, 0.30 | - |
| D | 2 | E, 0.80 | B, 0.20 | - |
| E | 1 | E, 1.00 | - | - |
| F | - | - | - | - |
| G | 2 | H, 0.70 | E, 0.30 | - |
| H | 1 | H, 1.00 | - | - |

FIG. 11

UNEQUAL MNPF ROUTING TABLE PROPORTIONS

| NEIGHBOR ID | A | B | C | D | E | F |
|---|---|---|---|---|---|---|
| FORWARDING PROBABILITY | 0.05 | 0.07 | 0.10 | 0.15 | 0.20 | 0.43 |

FORWARDING INTERVALS FOR FIG. 14

DECISION TREE FOR FIG. 15

OPTIMAL DECISION TREE FOR FIG. 15

EXAMPLE RN ROUTING TABLE

| DEST. NODE | # NEXT HOPS | FORWARD TO, THRESHOLD, ALIAS | |
|---|---|---|---|
| A | 1 | D, 1.00, D | - |
| B | 1 | D, 1.00, D | - |
| C | 1 | D, 1.00, D | - |
| D | 1 | D, 1.00, D | - |
| E | - | - | - |
| F | 1 | F, 1.00, F | - |
| G | 1 | G, 1.00, G | - |
| H | 2 | F, 1.00, F | G, 0.80, F |

FIG. 18

$i^{th}$ RECORD R[i]

| FORWARDING NEIGHBOR ID | $x_i$ |
|---|---|
| FORWARDING PROBABILITY | $p_i$ |
| CUTOFF PROBABILITY | $\theta_i$ |
| ALIAS NEIGHBOR ID | $a_i$ |

FIG. 19

ALGORITHM FOR DETERMINING RN NEXT HOP NODE

1) $i \leftarrow \lfloor mu \rfloor$     // $i \in \{0, ..., m-1\}$ and is uniform
2) $v \leftarrow mu - \lfloor mu \rfloor$     // $v \in [0,1]$ and is uniform
3) Select the $i^{th}$ record: if ($v \leq \theta_i$) return $x_i$; else return $a_i$

FIG. 21

EXAMPLE ARRAY OF 6 RECORDS CORRESPONDING TO FIG. 14

| RECORD NO. | | 0 | 1 | 2 | 3 | 4 | 5 |
|---|---|---|---|---|---|---|---|
| FORWARDING NEIGHBOR ID | $x$ | A | B | C | D | E | F |
| FORWARDING PROBABILITY | $p$ | 0.05 | 0.07 | 0.10 | 0.15 | 0.20 | 0.43 |
| CUTOFF PROBABILITY | $\theta$ | 0.30 | 0.42 | 0.60 | 0.90 | 1.00 | 0.90 |
| ALIAS NEIGHBOR ID | $a$ | F | F | F | E | E | E |

FIG. 22

2$^{ND}$ EXAMPLE ARRAY OF 6 RECORDS CORRESPONDING TO FIG. 14

| RECORD NO. | | 0 | 1 | 2 | 3 | 4 | 5 |
|---|---|---|---|---|---|---|---|
| FORWARDING NEIGHBOR ID | $x$ | A | B | C | D | E | F |
| FORWARDING PROBABILITY | $p$ | 0.05 | 0.07 | 0.10 | 0.15 | 0.20 | 0.43 |
| CUTOFF PROBABILITY | $\theta$ | 0.30 | 0.42 | 0.60 | 0.90 | 1.00 | 0.80 |
| ALIAS NEIGHBOR ID | $a$ | F | F | F | F | E | E |

FIG. 23

```
function Pivot( R[0...m−1] )
1)      ℓ ← 0
2)      r ← m−1
3)      while ( ℓ < r ) {
4)          if ( θ_ℓ ≤ 1 ) ℓ ← ℓ + 1
5)          else if ( θ_r > 1 ) r ← r − 1
6)          else {
7)              exchange R[ℓ] and R[r]
8)              ℓ ← ℓ + 1
9)              r ← r − 1
            }}
10)     if ( θ_ℓ ≤ 1 ) ℓ ← ℓ + 1
11)     return ℓ
```

```
procedure AliasSetup( R[0...m−1] )
Initialization
1)      for ( i ← 0 ; i < m ; i ← i + 1 ) {
2)          θ_i ← m × p_i
3)          a_i ← x_i
        }
Call to Pivot
4)      j ← Pivot(R)    // j is the first index for which θ_j > 1.
5)      if ( j = 0 ) return
6)      i ← 0
Iteration
        // Loop Invariants: i < j ; θ_ℓ ≤ 1 for 0 ≤ ℓ ≤ i ; θ_r > 1 for j ≤ r < m
7)      while ( j < m ) {
8)          a_j ← x_j
9)          θ_j ← θ_j + θ_i − 1
10)         i ← i + 1
11)         if ( θ_j ≤ 1 ) j ← j + 1
        }
```

FIG. 24

SBSDM ROUTING TABLE FOR NODE E

| DESTINATION RANGE | NEXT HOP |
|---|---|
| 85.13.0.0/16 | F |
| 12.1.2.0/24 | F |
| 12.1.3.180/30 | F |
| 12.1.4.0/24 | G |
| 24.6.141.64/26 | G |

STREAM BASIS SET DIVISION MULTIPLEXING

CROSS REFERENCE TO RELATED APPLICATION

This application claims the benefit under 35 U.S.C. §119 (e) of provisional application Ser. No. 61/195,346, entitled "Stream-Basis Set Division Multiplexing", filed Oct. 7, 2008. The subject matter of provisional application Ser. No. 61/195,346 is incorporated herein by reference in its entirety.

TECHNICAL FIELD

The present invention relates generally to the sending of data over a network, and more particularly to the optimizing of routing tables for network routing.

BACKGROUND

FIG. 1 (Prior Art) shows a strongly connected directed graph 100 representing a network of routers and allowed links between adjacent routers for an information packet directed to network router H 108. The directed graph 100 illustrates the use of Source-Independent Single-Path routing according to traditional routing schemes like minimum hops or shortest path. Oval shapes represent network routers, also referred to as hosts or "nodes", that forward information packets from a source device, such as a home computer connected to a node, to a destination device, such as another home computer connected to a node. Shown are node A 101, node B 102, node C 103, node D 104, node E 105, node F 106, node G 107 and node H 108. Also shown are an example information packet source device 109 connected to node E 105 and an example information packet destination device 110 connected to node H 108.

Where an information packet originates from a given source device, it must always first pass through the node to which the source device is connected. This first node will be referred to here as the source router. Where the information packet is destined for a given destination device, the last node the information packet passes through is the node to which the destination device is connected. This last node will be referred to here as the destination router. The destination router can be determined from the packet's destination address using well known network topology protocols. Accordingly, where an information packet originates from source device 109 destined for destination device 110, the source node is node E 105, and the destination node is node H 108. An information packet typically includes destination data from which can be determined the destination device and destination node, as well as source data from which can be determined the source device and source node.

In the directed graph 100, darkened arrows indicate allowed links between nodes for forwarding an information packet to destination node H 108. For any given node which is to forward an information packet to destination node H 108, the information packet will always be forwarded to the same next adjacent node. The next adjacent node forwarded to is also referred to as a "next hop".

Arrow 111 indicates the link by which node A 101 forwards the information packet to node B 102. Arrow 112 indicates the link by which node B 102 forwards the information packet to node F 106. Arrow 113 indicates the link by which node C 103 forwards the information packet to node G 107. Arrow 114 indicates the link by which node D 104 forwards the information packet to node E 105. Arrow 115 indicates the link by which node E 105 forwards the information packet to node F 106. Arrow 116 indicates the link by which node F 106 forwards the information packet to node H 108. Arrow 117 indicates the link by which node G 107 forwards the information packet to node H 108. Non-darkened arrows illustrate links which are not allowed when the destination node is node H 108. A directed graph of paths to a different destination node would have a different set of allowed and non-allowed links.

Thus, an information packet originating at source device 109 and destined for destination device 110 will first pass to node E 105. Node E 105 will always forward the information packet to next hop node F 106 via link 115. Node F 106 will always forward the information packet to next hop node H 108 via link 116. Node H 108 (the destination node) will then forward the information packet to destination device 110.

As can be seen from the darkened link arrows, there is always a single route from a given node to a given destination node when using this Single-Path routing method. Because the route is determined based on the destination of the information packet, and not determined based on the source of the information packet, the method is referred to as Source-Independent Single-Path routing.

FIG. 2 (Prior Art) is a simplified view of an example node E 105 implementing Source-Independent Single-Path routing. Node E 105 includes a processor 200 and a memory 201. Processor 200 and memory 201 communicate via buses 202 and 203. Memory 201 stores network topology information 204 according to a well-known protocol such as Open Shortest Path First (OSPF) or Intermediate System to Intermediate System (ISIS). An algorithm 205 running on the processor 200 uses the network topology information 204 to determine which adjacent node should be the next hop an information packet takes from node E 105 given the destination node of the information packet. These destination-dependent next hops are stored in memory 201 as the routing table 206 for node E 105.

The algorithm 205 that builds the routing table uses a traditional routing scheme such as minimum hops or shortest path. These traditional routing schemes rely on forwarding a given information packet to a single neighboring router based on its destination for several reasons.

First, the cost of each link between neighboring routers is constant. This link cost is also known as a link metric. Link costs can be based on a link delay or a link transmission time. In the case of hop counting, every link cost is set to be equal. When the link costs change for any reason, so do the routing tables that determine forwarding neighbors. In the algorithm 205 that builds the routing table 206, the cost of a path between the forwarding node 105 and a destination node is determined by adding the costs of the intervening path links. And, the dynamic programming principle of optimality applies, meaning that all sub-paths of a path between the forwarding node 105 and a destination router must be optimal. Determining the cost of a path by adding the costs of the path links is known as the Link Metric Model.

Additionally, it is simple to avoid creating undesirable looping paths or "directed cycles" using Single-Path routing methods. FIG. 3 (Prior Art) is a an expanded view of simplified routing table 206 for node E 105. Row 300 indicates that the next hop when an information packet is destined for destination router H 108 is node F 106. Row 301 indicates that the next hop node when an information packet is destined for destination router F 106 is node F 106.

FIG. 4 (Prior Art) is a simplified view of an example routing table 400 for node F 106, shown for comparison with the example routing table 206 for adjacent node E 105, illustrating the lack of looping, also known as a "directed cycle", between node E 105 and node F 106. Row 401 indicates that the next hop node when an information packet is destined for destination router H 108 is node H 108. Row 402 indicates that the destination router has been reached when an information packet is destined for destination router F 106. By comparing routing table rows 300 and 301 with routing table rows 401 and 402, it is seen that for instances when the next hop node from node E 105 is node F 106, the next hop node from node F 106 is never node E 105.

In this way, routing tables for adjacent nodes are constructed such that information packets do not follow directed cycles in the Single-Path routing methods. And, because routing table next hops in Single-Path routing methods depend only on the destination of the information packet, and not the source, Single-Path routing methods can be referred to as Source-Independent Single-Path routing. However, problems inherent in Source-Independent Single-Path include over-utilizing, and therefore congesting, the links along optimal paths. Conversely, other links can remain largely underutilized.

In contrast, Multi-Path routing methods can utilize more available links and better avoid link congestion. Known Multi-Path routing methods calculate a set of "best" disjoint paths for an information packet from a particular source to a particular destination node and channel traffic between those two nodes along those paths, in inverse proportion to their costs. Disjoint paths do not share the same set of nodes or links. In a network, this has to be done for every possible pair of source and destination nodes. FIG. 5 (Prior Art) is a directed graph 500 of the network of routers of FIG. 1 (Prior Art) and links between adjacent routers illustrating the use of Source-Dependent Multi-Path routing.

Darkened arrows in the directed graph 500 of a network indicate allowed links between nodes for forwarding an information packet according to Multi-Path routing when the source node is node A 501 and the destination node is node H 508. A Multi-Path routing method would, for example, use not only the path from node A 501 to node B 502 via link 511, then from node B 502 to node F 506 via link 512, and then from node F 506 to node H 508 via link 514, but also the disjoint path from node A 501 to node C 503 via link 517, then from node C 503 to node G 507 via link 513, and then from node G 507 to node H 508 via link 515 to transport packets from source node A to destination node H. Non-darkened arrows illustrate links which are not allowed when the source node is node A 501 and the destination node is node H 508.

Because routing in known methods of Multi-Path routing requires consideration of the source of the information packet in order to prevent paths with directed cycles, known Multi-Path routing methods can be referred to as Source-Dependent Multi-Path routing. As can be seen from the darkened link arrows, additional paths to the destination router are available when using Source-Dependent Multi-Path routing rather than Source-Independent Single-Path routing method. Directed cycles are prevented because routing tables under Source-Dependent Multi-Path routing methods refer to both the source and the destination of an information packet to determine the next hop.

However, in a network with thousands of nodes, Source-Dependent Multi-Path routing presents at least two obstacles. Calculating a set of best disjoint paths from every possible source node to every possible destination node can be computationally intractable. Further, the memory requirements for storing a Source-Dependent Multi-Path routing table can be impractical.

FIG. 6 (Prior Art) shows a portion of a simplified Source-Dependent Multi-Path routing table 600 for node E 505 of FIG. 5 (Prior Art). The source-dependent entries cause the routing table 600 to balloon in size, even in our small example network of only eight routers. In a real network of thousands of routers and hundreds of thousands of destination addresses, the Source-Dependent Multi-Path routing table can approach terabyte size.

SUMMARY

A source-address independent routing method called Multi-Neighbor Proportional Forwarding (MNPF) is disclosed. A proportional forwarding routing table is present on the data path of the network node. In one aspect, the MNPF capable node uses an information packet's destination address to determine a plurality of neighbors it has proportional likelihoods to forward that packet to. One of these neighbors is then selected, independent of the source of that packet, and the packet is forwarded to the selected neighbor. The neighbors are selected in some pre-determined proportions to maximize throughput. The routing method embeds minimal congestion and maximal load distribution in its requirement criteria. It includes procedures for determining the optimal proportions by which a neighbor is selected. It also includes procedures for determining the optimal multiple paths in the network along which packets can be routed without undesirable loops developing. The method can be used in typical Internet Protocol (IP) suite networks, or with other network protocols such as Asynchronous Transfer Mode (ATM).

The implementation of the MNPF routing method consists of two phases: a setup phase and a run phase. In one aspect, the setup phase gathers information about the network topology and the costs associated with the links in the network. In one aspect, costs are determined by reference to the bandwidth or throughput of networks links. In another aspect, costs can be determined by reference to link delays or link transmission times. Setup then outputs information in terms of optimal paths and parameters that are necessary to set up routing/forwarding tables. The optimal path and parameter information is described here in terms of optimal Forwarding Directed Acyclic Graphs (FDAGs) rooted at each destination node. In one aspect, the optimal FDAGs are changed when the network topology changes, when the capacities of forwarding links changes, or when other information as to network conditions changes.

The setup phase exists in the control plane of a router. The run phase is the use of said routing tables to route data packets. It is important to emphasize that the MNPF method is a method of determining routing tables, and not a protocol.

In one aspect, an engine running on each network router determines the FDAGs for forwarding a packet to each destination node from any other network node, and then sets up the appropriate proportional forwarding routing table for the particular router. In another aspect, MNPF nodes are in a mixed network with routers that do not implement Multi-Neighbor Proportional Forwarding. In the latter case, determination of optimal FDAGs and MNPF routing tables takes into account that some nodes do not implement the MNPF method. In yet another aspect, a subset of network nodes or computing devices other than routers can determine the optimal FDAGs and then assign MNPF routing tables to MNPF-capable nodes.

In one aspect, MNPF routing is implemented using a variant of the MNPF routing table called the Random Neighbor (RN) routing table. The RN routing table implements MNPF forwarding proportions using thresholds and aliases, such that random selection of a next hop node can be performed in the run time of the network.

In another aspect, MNPF forwarding proportions are approximated within the structure of a traditional format routing table using Stream Basis Set Division Multiplexing. In this variant of MNPF routing, forwarding proportions and packet order are maintained without random selection of next hop nodes and without changing the format of known routing tables.

The multi-path routing method provides maximized throughput, reduced congestion and superior load balancing over single-path routing. Source-address independence also overcomes a major problem of more traditional source-address dependent multi-path routing methods. Data structures and methods for determining the optimal paths and parameters are provided.

Other structures and methods are described in the detailed description below. This summary does not purport to define the invention. The invention is defined by the claims.

BRIEF DESCRIPTION OF THE DRAWINGS

The accompanying drawings, where like numerals indicate like components, illustrate embodiments of the invention.

FIG. 7B is a table 722 corresponding to the FDAG 700 of FIG. 7A.

FIG. 10 is an expanded view of a simplified proportional forwarding routing table 906 for node E 705 of FIG. 9.

For comparison with the routing table 906 of FIG. 10, FIG. 11 is a simplified view of an example proportional forwarding routing table 1100 for node F 706 of FIG. 8.

FIG. 18 shows an example Random Neighbor (RN) routing table, which is a variant of the MNPF routing table allowing random selection of an allowed next hop with the correct probabilities in constant-time.

FIG. 19 is the $i^{th}$ record R[i] in an array of records for a node having multiple adjacent next hop nodes illustrating an aspect of the "Alias" method.

FIG. 21 illustrates an example of the run phase of the Alias method, in which the next hop neighbor is randomly selected.

FIG. 22 shows an example array of six records with cutoff probabilities and alias neighbor ID's corresponding to forwarding probabilities of FIG. 14.

FIG. 23 shows a second possible example array of six records with cutoff probabilities and alias neighbor ID's also corresponding to forwarding probabilities of FIG. 14.

FIG. 24 shows the setup phase of the Alias method, in which the cutoff probabilities and alias ID's for an RN routing table are computed, based on an array of MNPF forwarding proportions.

DETAILED DESCRIPTION

Reference will now be made in detail to some embodiments of the invention, examples of which are illustrated in the accompanying drawings.

Figure 1:
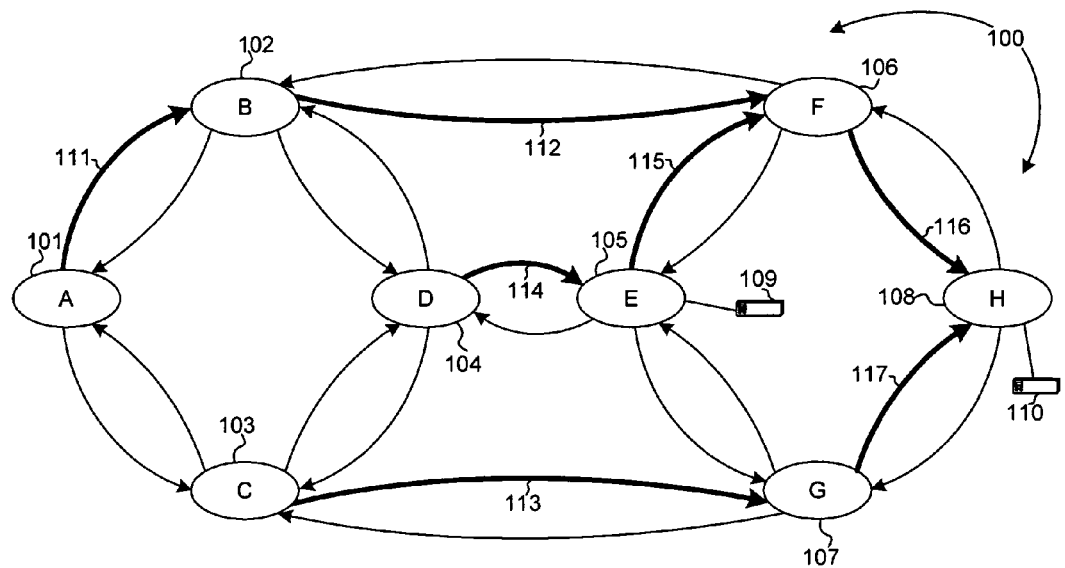
FIG. 1 (Prior Art) shows a strongly connected directed graph representing a network of routers and allowed links between adjacent routers for Source-Independent Single-Path (SISP) routing.
Figure 2:
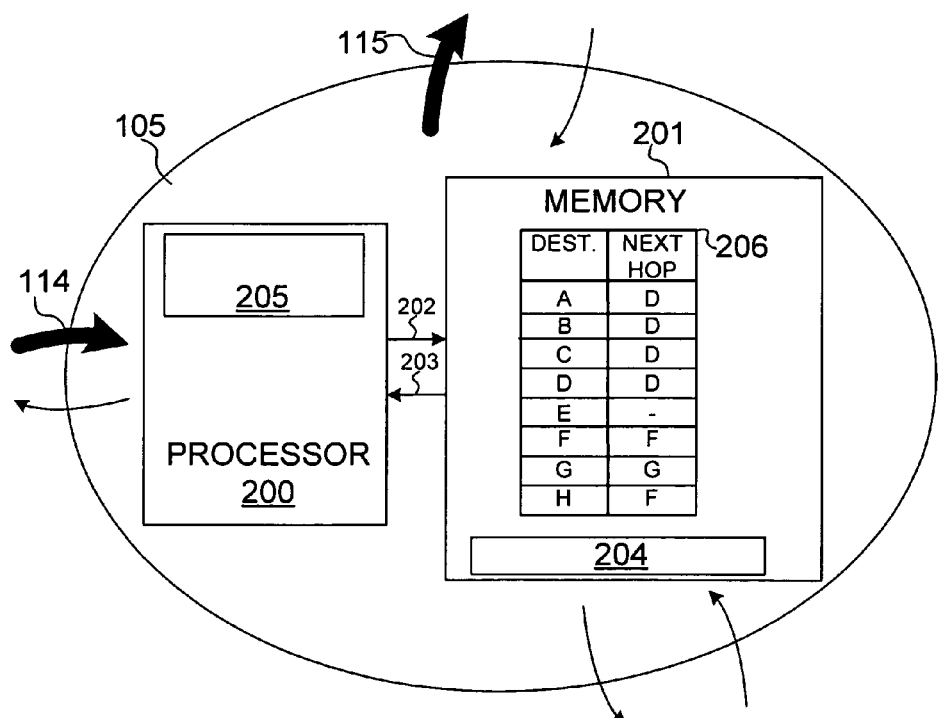
FIG. 2 (Prior Art) is a simplified view of node E 105, expanded, of FIG. 1, implementing Source-Independent Single-Path routing.
Figure 3:
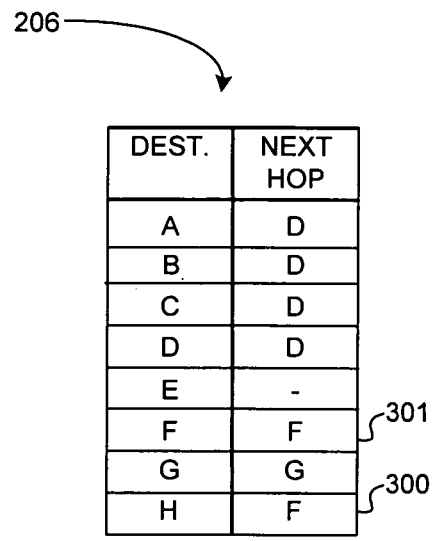
FIG. 3 (Prior Art) is an expanded view of the simplified Source-Independent Single-Path routing table for node E 105 of FIG. 2.
Figure 4:
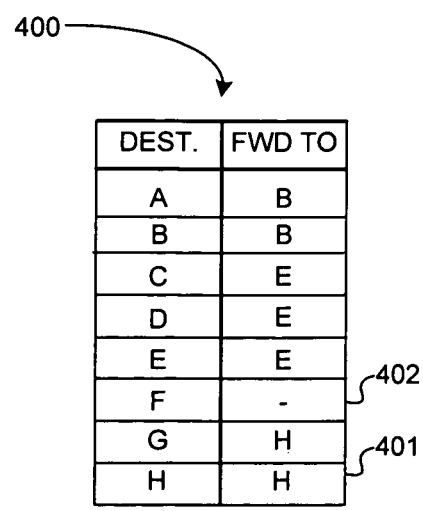
FIG. 4 (Prior Art) is a simplified view of an example routing table 400 for node F 106, shown for comparison with the example routing table 206 for adjacent node E 105

FIG. 7 is a Forwarding Directed Acyclic Graph (FDAG) 700 of routers and links between adjacent routers in a network, illustrating an aspect of Multi-Neighbor Proportional Forwarding. The FDAG is defined as a subset of links for the network such that there are no directed cycles and such that all traffic can reach a destination node. In FIG. 7, the destination node is node H 708. As with FIG. 1, oval shapes represent network nodes and arrows represent forwarding links between nodes. Shown are node A 701, node B 702, node C 703, node D 704, node E 705, node F 706, node G 707 and node H 708. The FDAG is rooted at destination node h 708. Darkened arrows denote the subset of allowed links in the FDAG 700 of a network such that there are no directed cycles and such that an information packet at any node can reach node H 708. The illustrated nodes are MNPF capable and forward the information packet to destination node H 708 via one of the more than one allowed next hop links using Multi-Neighbor Proportional Forwarding.

Node A 701 can forward the information packet to node B 702 via link 711, or to node C 703 via link 712. Node B 702 can forward the information packet to node D 704 via link 713, or to node F 706 via link 714. Node C 703 can forward the information packet to node D 704 via link 715, or to node G 707 via link 716. Node D 704 in the illustrated FDAG 700 rooted at destination node H 708 has only one allowed next hop to node E 705 via link 717.

Node E 705 can forward the information packet to node F 706 via link 718, or to node G 707 via link 719. Node F 706 has only one allowed next hop to destination node H 708 via link 720, and Node G 707 has only one allowed next hop to destination node H 708 via link 721. By following the darkened arrows indicating allowed links, it is seen that a packet is never returned to a node from which it has been forwarded, thus avoiding directed cycles.

Non-darkened arrows illustrate links which are not allowed in the FDAG 700 rooted at destination node H 108. In this way, the illustrated FDAG 700 spreads network traffic over more than one path to a given destination router, reducing link congestion in the network.

Figure 7A:
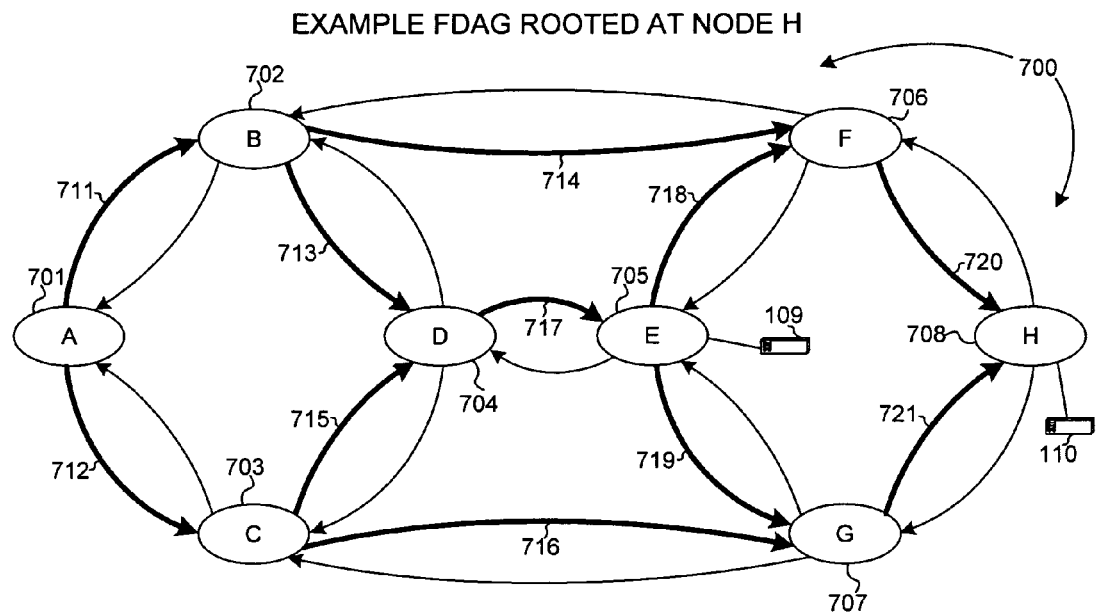
FIG. 7A is a Forwarding Directed Acyclic Graph (FDAG) 700 rooted at destination node H 708, illustrating an aspect of Multi-Neighbor Proportional Forwarding (MNPF).

FIG. 7B is a table 722 corresponding to the FDAG 700 of FIG. 7A. The table 722 contains the proportions for forwarding an information packet to destination node H 708 from any other node in the network. Column "From Node" 723 to column "To Node" 724 indicates the direction of the link and column "Proportion" 725 contains the fraction of traffic originating at a given node that is to be forwarded along that link. Note that the proportions going out of any "From Node" add up to 1.0.

Figure 8:
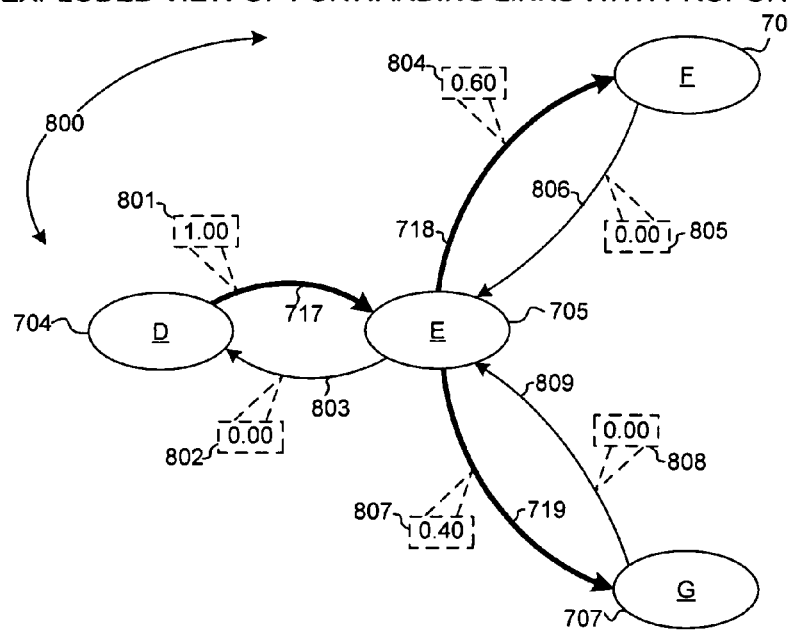
FIG. 8 shows an expanded view of node E 705 of FIG. 7, and adjacent nodes, with proportional likelihoods of forwarding an information packet, destined for node H 708, to one of a determined plurality of neighboring nodes.

FIG. 8 shows an expanded view 800 of node E 705 of FIG. 7, adjacent routers, and links between node E 705 and adjacent routers. Also shown are the proportional likelihoods of each link being used to forward an information packet to one of multiple neighboring nodes in the case where the information packet is destined for destination node H 708. Node D 704 will always forward the information packet to next hop node E 705, thus the indicated proportional likelihood 801 of the information packet at node D 704 being forwarded via link 717 to adjacent node E 705 is 1.00 out of 1.00, or one hundred percent. The indicated proportional likelihood 802 of the information packet at node E 705 being forwarded via link 803 to neighboring node D 704 is 0.00 out of 1.00, or zero percent. Because node E 705 never forwards an information packet destined for destination router H 708 to node D 704, the information packet never follows an undesirable directed cycle between these two nodes.

The indicated proportional likelihood 804 of the information packet at node E 705 and destined for destination router H 708 being forwarded via link 718 to adjacent node F 706 is 0.60 out of 1.00, or sixty percent. The indicated proportional likelihood 805 of the information packet at node F 706 being forwarded via link 806 to adjacent node E 705 is 0.00 out of 1.00, or zero percent. Again, because node F 706 never forwards an information packet destined for destination router H 708 to node E 705, the information packet never follows an undesirable directed cycle.

Similarly, the indicated proportional likelihood 807 of the information packet at node E 705 and destined for destination router H 708 being forwarded via link 719 to neighboring node G 707 is 0.40 out of 1.00, or forty percent. The indicated proportional likelihood 808 of the information packet at node G 707 being forwarded via link 809 to adjacent node E 705 is 0.00 out of 1.00, or zero percent. Because node G 707 never forwards an information packet destined for destination router H 708 to node E 705, the information packet never follows an undesirable directed cycle between these two routers. However, because node E 705 has a greater-than-zero proportional likelihood of forwarding the information packet to either of node F 706 and node G 707, node E 705 spreads network traffic over more than one path to destination node H 708.

Figure 9:
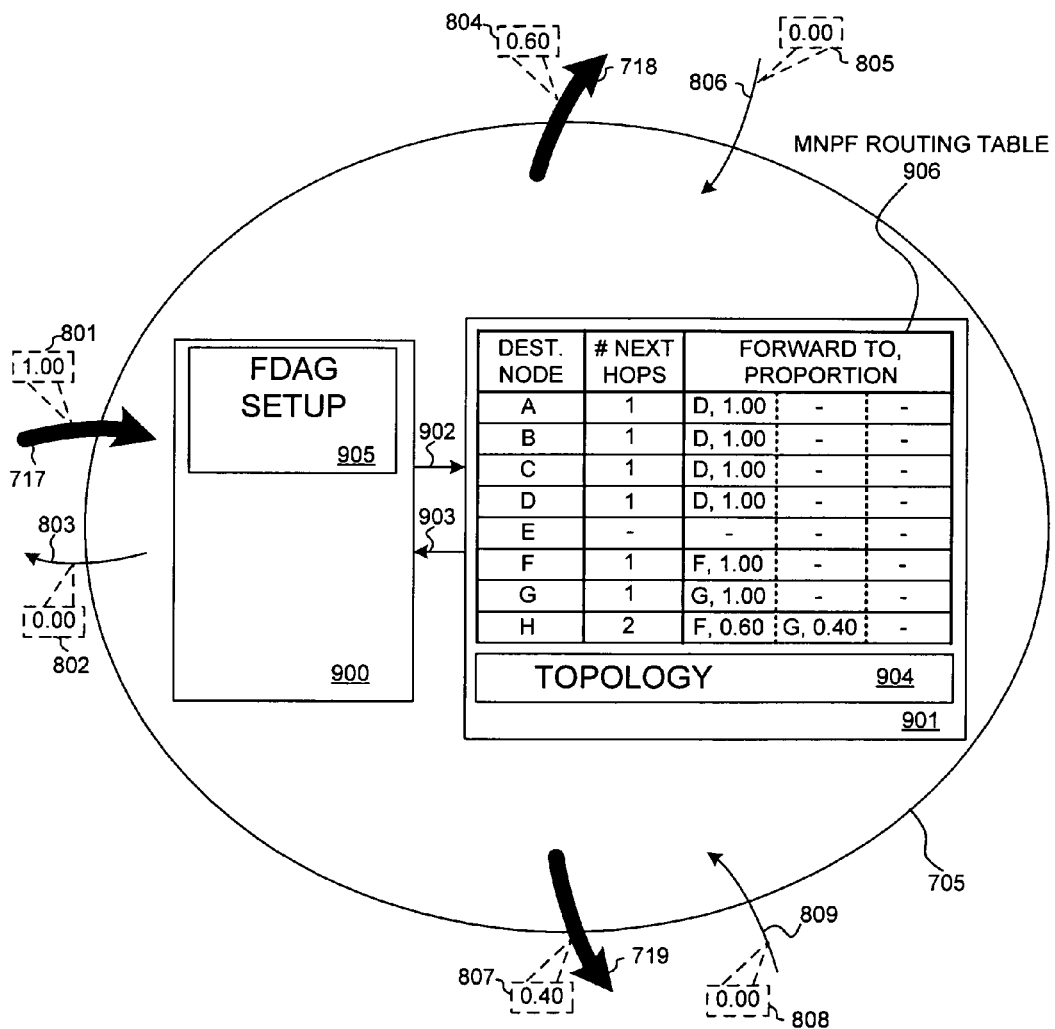
FIG. 9 is a simplified view of node E 705 of FIG. 8 illustrating one embodiment.

FIG. 9 is a simplified view of node E 705 of FIG. 8 illustrating one embodiment. Node E 705 includes a processor 900 and a memory 901. Processor 900 and memory 901 communicate via buses 902 and 903. Memory 901 stores network topology information 904 according to a well-known protocol such as OSPF or ISIS. An FDAG set-up engine 905 running on the processor 900 uses the network topology information 904 for computing Optimal FDAGs for each possible destination node of the network. The FDAG set-up engine 905 uses the computed FDAGs and proportions to determine the appropriate entries for each destination node in a MNPF routing table 906 for node 705. The proportional forwarding table 906 for the node 705 is stored in memory 901 for later use in forwarding of an information packet to its destination. Other MNPF capable nodes in the network each run their own instance of the FDAG set-up engine 905 to determine their own proportional forwarding tables. Note that FDAG engines can be run on a subset of MNPF capable routers, in which case these routers determine routing tables for other MNPF capable routers.

FIG. 10 is an expanded view of a simplified proportional forwarding routing table 906 for node E 705 of FIG. 9. Because the specific method of generating the table described here is called Multi-Neighbor Proportional Forwarding (MNPF), the routing table can be referred to as an MNPF routing table. However, "proportional forwarding table" or "MNPF routing table" can refer to any routing table data for proportional forwarding of information packets to adjacent nodes without reference to the source of the information packets.

Figure 5:
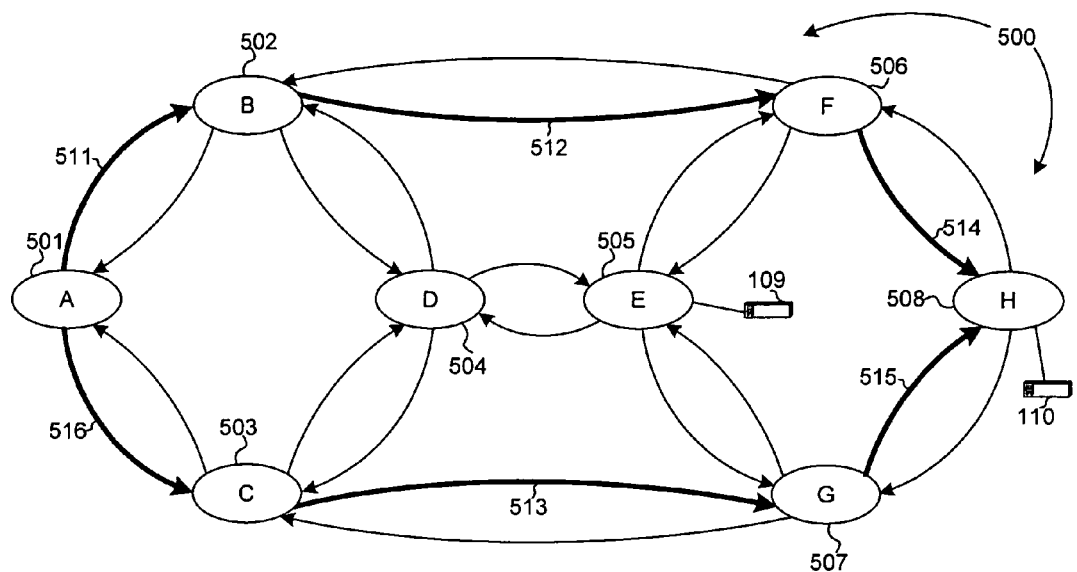
FIG. 5 (Prior Art) shows a strongly connected directed graph representing a network of routers and allowed links between adjacent routers, illustrating the use of Source-Dependent Multi-Path (SDMP) routing.

Three columns are shown: "Destination Node" 1001, "Number of Allowed Next Hops" 1002, and "Forward To, Proportion" 1003. Since the nodes in the example directed graph of FIG. 5 have either two or three neighbors, the Forward To, Proportion column 1003 shows space for up to three next hops with proportional likelihoods for forwarding to each allowed next hop. Row 1004 and row 1005 of the routing table 906 indicate destination routers for which node E 705 has a greater-than-zero likelihood of forwarding an information packet to node F 706. Proportional likelihoods 804 and 807 from FIG. 8 are entered in the routing table 906 row 1005 showing that, for destination router H 708, node E 705 has greater-than-zero proportional likelihoods of forwarding an information packet to one of node F 706 and node G 707.

For comparison with the routing table 906 of FIG. 10, FIG. 11 is a simplified view of an example Multi-Neighbor Proportional Forwarding routing table 1100 for node F 706 of FIG. 8. Row 1101 and row 1102 of the routing table 1100 show that in cases where node E 705 has a greater-than-zero likelihood of forwarding an information packet to node F 706, node F 706 has zero likelihood of forwarding the information packet to node E 705.

FIGS. 10 and 11 are simplified example routing tables for Multi-Neighbor Proportional Forwarding. Actual routing tables involve more information and may take different formats.

A Method for Constructing the Optimal FDAG

Figure 12:
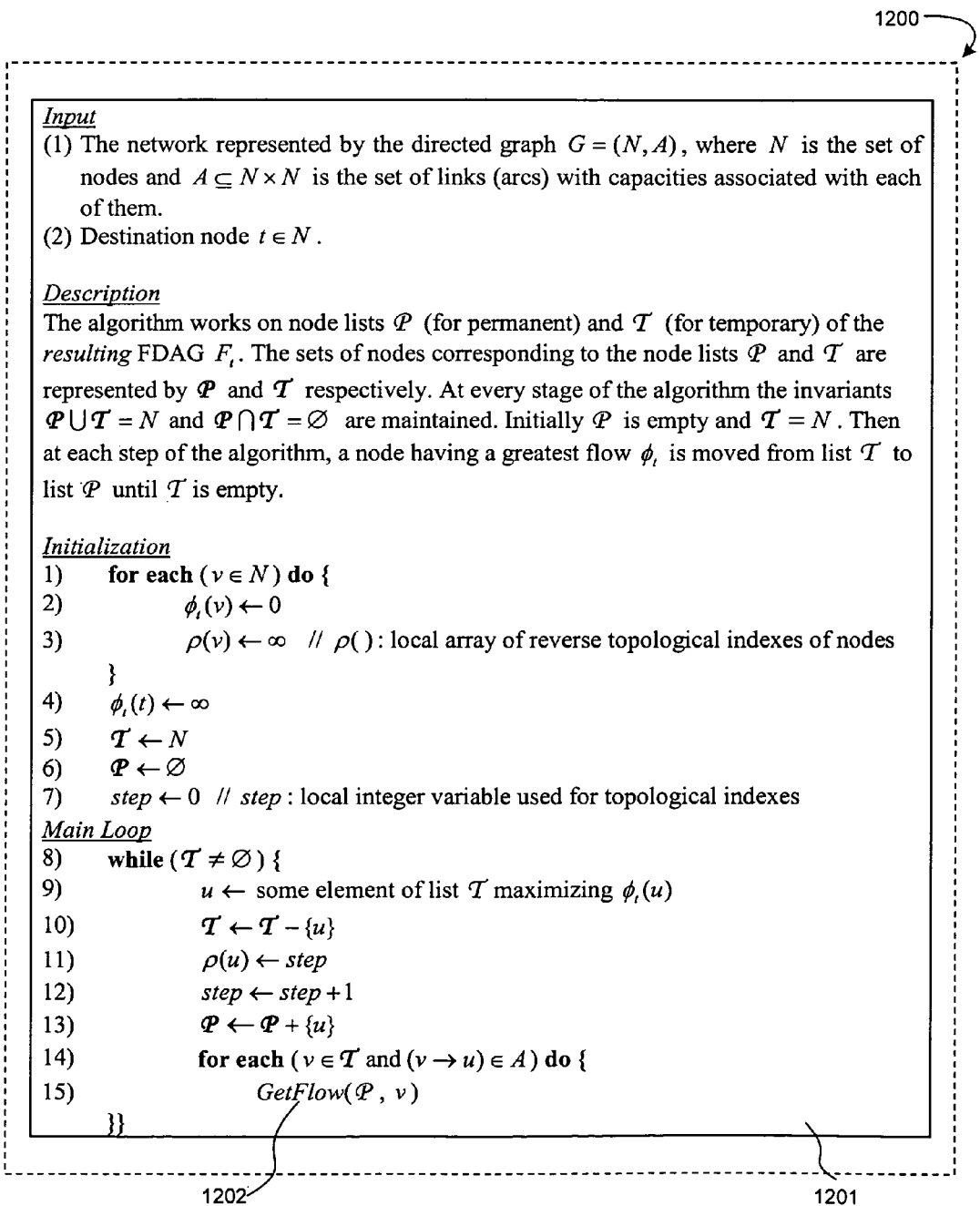
FIG. 12 illustrates an embodiment of a method for constructing the Optimal FDAG.

FIG. 12 shows an embodiment of the Multi-Neighbor Proportional Forwarding method for constructing the Optimal FDAG. During the setup phase, the MNPF approach constructs Optimal FDAGs for every possible destination node in the network, and then assigns proportional likelihoods of forwarding to allowed next hops for the MNPF routing tables. The method assumes that (i) a network is given with capacities specified for every link; (ii) all nodes are capable of executing the MNPF method; (iii) a destination node t∈N is specified. Optimal packet flow computation and determination of proportional forwarding likelihoods for nodes of an FDAG starts at the destination node and then moves backwards toward the source nodes. The flow computation and addition of the next source node to the FDAG, moving backwards from the destination node, is dependent on the graph computed up to this point and the forwarding proportions computed up to this point.

Let the network be represented by the directed graph G=(N,A), where N is the set of nodes and A⊆N×N is the set of links with capacities associated with each of them. Node t is the destination node. Given this input, the Optimal FDAG finding method 1200 is shown in FIG. 12.

The method in module 1201 automates the following procedure: Given a network topology and a destination node, it maximizes the rate of packets flowing to that destination (see FIG. 12) for an FDAG rooted at the destination node. The method not only provides the structure of the Optimal FDAG but also computes all the optimal forwarding proportions to the destination node.

The steps of the method are given in 1201. The method works on node lists $\mathcal{P}$ (for permanent) and $\mathcal{T}$ (for temporary) of the resulting FDAG $F_t$. At every stage of the method the invariant $\mathcal{P} \cup \mathcal{T} = N$ is maintained. Initially $\mathcal{P}$ is empty and $\mathcal{T} = N$. Then, at each step of the method, a node having the greatest flow (see FIG. 12) is moved from list $\mathcal{T}$ to list $\mathcal{P}$ until $\mathcal{T}$ is empty.

In particular note that the array ρ in 1201 gives the reverse topological numbers of the nodes in $\mathcal{P}$. In order to do this for a node, 1201 records the step number (provided by the counting variable step) at which that node has been added to $\mathcal{P}$.

Step 9) of 1201 is the greedy step of the method where a node u of maximum flow $\phi_t(u)$ is selected from the list $\mathcal{T}$. Step 10) of 1201 deletes node u from $\mathcal{T}$. Immediately in step 11) of 1201, the reverse topological index of u is set in the global array ρ. Step 13) inserts u into $\mathcal{P}$. At this step, the forwarding neighbors of u, the forwarding proportions, and the maximum flow $\phi_t(u)$ from u are recorded.

Once u is inserted into $\mathcal{P}$, step 14) of 1201 finds the maximum flow values of all the remaining nodes in $\mathcal{T}$ that point to u, by calling the GetFlow procedure 1202 (see FIG. 12) on them in step 15). This is necessary so that at the next iteration of the Main Loop, step 9) of 1201 can be executed correctly.

Tie-Breaking for Constructing the Optimal FDAG

One of the problems in step 9) of 1201 is to break a tie between contending nodes that may all have the same value for flow $\phi_t$. To achieve this, the following heuristic is adopted:

Every node has a unique label and these labels come from an ordered set. Furthermore, a record is kept for how many times a particular node has been considered for inclusion in the permanent set $\mathcal{P}$. Given a contention between two nodes having the same maximum flow, the node that has been considered more often is declared the winner in the tiebreaker. If both of them have been considered the same number of times then their unique labels are used to break the tie.

The GetFlow Method

In this section we describe the GetFlow procedure 1202. Given a partial FDAG, this procedure determines the next candidate node in $\mathcal{T}$ for inclusion in the permanent set $\mathcal{P}$.

At the heart of the GetFlow procedure 1202 is the n×a Unit-flow Matrix M, where n is the number of nodes and a is the number of links in the directed graph G=(N,A). At any stage of the method in module 1201, M keeps a record of the amount of flow that would go through link, if a unit flow were sent from a node u∈$\mathcal{P}$. Thus the $ij^{th}$ entry of M[i,j] gives the amount of flow through link j if a unit flow were sent from node i∈$\mathcal{P}$.

Figure 13:
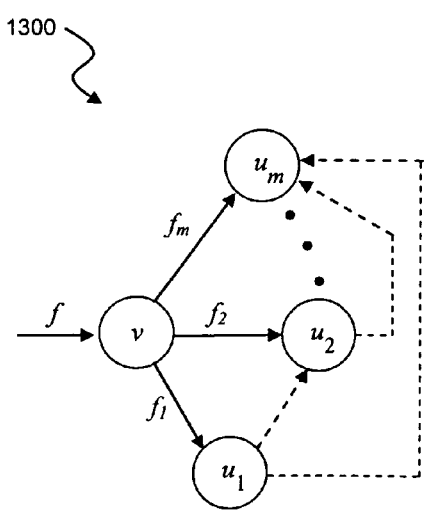
FIG. 13 is a diagram illustrating the use of the GetFlow function to find maximum traffic flow from a given node, such that the function is reduced to a Linear-Programming problem in a standard form.
Figure 6:
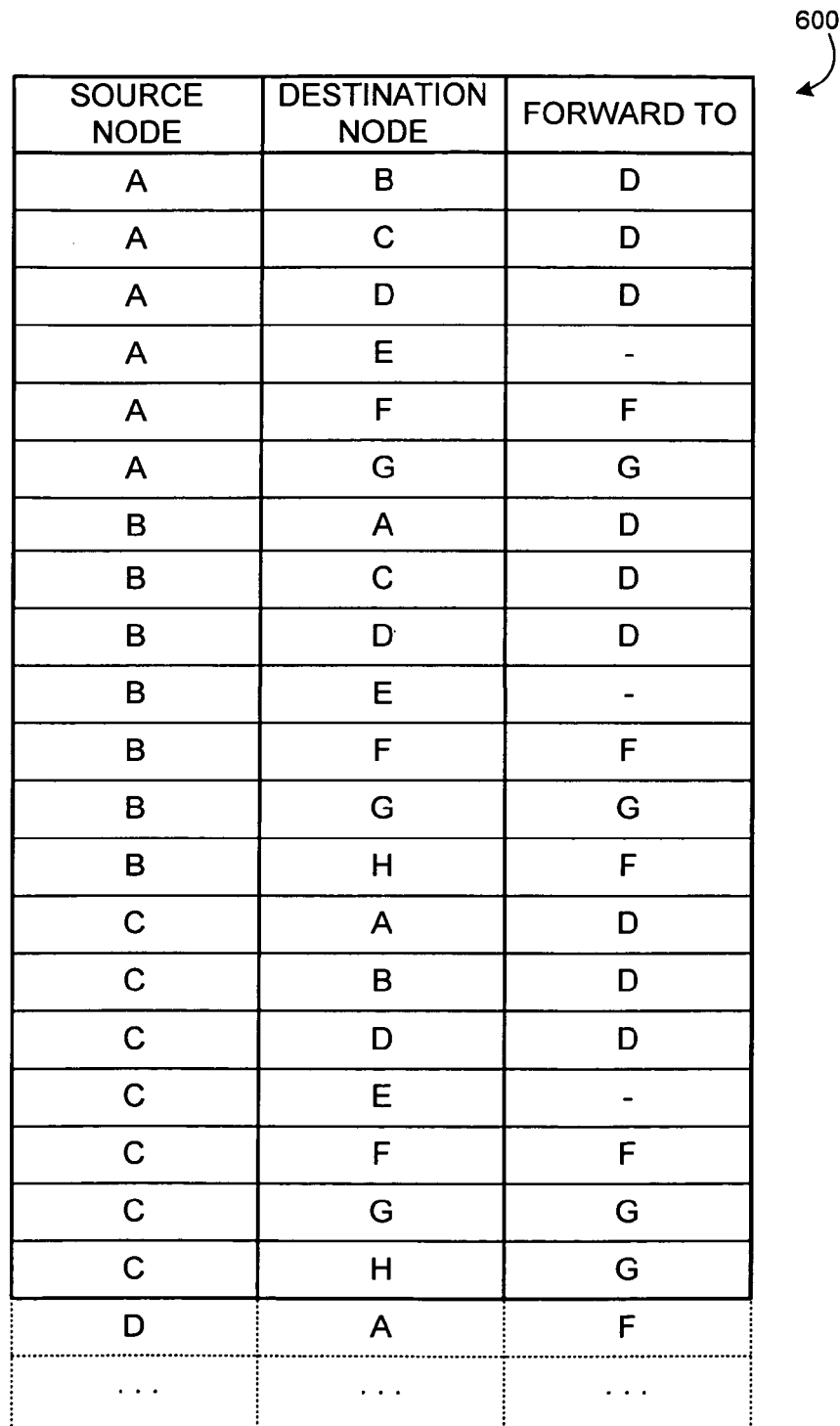
FIG. 6 (Prior Art) shows a portion of a simplified Source-Dependent Multi-Path routing table 600 for node E 505 of FIG. 5 (Prior Art).

Consider the general case 1300 depicted in FIG. 13, where v is a node in set $\mathcal{T}$ and it has m forwarding neighbors $u_1, \ldots, u_m$ all belonging to set $\mathcal{P}$. This condition corresponds to step 15) in module 1201 of FIG. 12, at GetFlow 1202. Then, to find the maximum flow from node v, one need's to maximize the flow $f = f_1 + \ldots + f_m$, where $f_i$ is the flow sent to node $u_i$ for 1≤i≤m. Note that the non-negativity constraint $f_i \geq 0$ applies for 1≤i≤m.

This flow maximization is also subject to the capacity constraints of each link. Therefore, if $c_i, \ldots, c_m$ are the capacities of links $v \rightarrow u_1, \ldots, v \rightarrow u_m$, the constraint is $f_i \leq c_i$ for 1≤i≤m. And, $$\sum_{i=1}^{m} M[u_i, l] f_i \leq c_l$$

for all links l with capacity $c_l$, both of whose endpoints belong to $\mathcal{P}$. This problem is therefore reduced to a Linear-Programming problem in a standard form.

A variety of methods are known that solve the general Linear-Programming problem. However, the context of this particular problem makes the application of a general Linear-Programming Solver excessive. In particular, the fact that the problem is on a rooted directed acyclic graph helps in achieving a lower time complexity solution to this problem.

Let $\phi$ be the maximum flow found from node v, and $\phi_i$ represent the corresponding flow that it sends to forwarding neighbor $u_i$ (1≤i≤m). In the final bookkeeping step of method GetFlow 1202, the $v^{th}$ row of matrix M is updated as follows:

M[v,v→$u_i$]=$\phi_i/\phi$ for 1≤i≤m $$M[v, l] = \frac{1}{\phi} \sum_{i=1}^{m} M[u_i, l] \varphi_i$$

for all arcs l both of whose endpoints belong to $\mathcal{P}$.

Note that if v is chosen for inclusion into $\mathcal{P}$ in step 9) of module 1201, then the $v^{th}$ row of matrix M cannot change any more. Otherwise, there is always a possibility that it could change v is considered once again in step 15) of 1201. Also note that if v is chosen in step 9), the contents of M[v,v→$u_i$]

for 1≤i≤m are the optimal forwarding proportions from v to its forwarding neighbors $u_1, \ldots, u_m$.

A Variant of the Method for Mixed Networks

For the explanation of FIG. 12 (see above) we assumed that all nodes in the network were capable of executing the MNPF method. In real life, that will not always be the case. MNPF capable nodes will be intermingled with nodes that follow a Single-Path Routing protocol. We therefore now study a variant of the above method for this case. The differences in the assumptions are: (i) not all nodes are capable of executing the MNPF method; (ii) these non-MNPF capable nodes follow a Single-Path Routing protocol; (iii) all MNPF capable nodes are aware of the capabilities of all the other nodes in the network; and, (iv) all non-MNPF capable nodes assume that all nodes are similar to themselves. Given that all Single-Path Routings establish a directed tree $\Psi_t$ rooted at the destination node t, the method simply allows MNPF capable nodes to grow their multiple paths starting from this skeletal tree. While this does not lead to optimality, this variant method is important for interoperability in a mixed node network.

The main differences between this method and the Optimal FDAG method of FIG. 12 are: (1) instead of developing its own topological ordering though the array ρ, this array is given to the method as input by the topological ordering of the tree $\Psi_t$; (2) since the array ρ defines the order in which nodes are added in the tree $\Psi_t$, this method uses the same order for addition to its permanent set $\mathcal{P}$, instead of determining a node with the maximum flow as in step 9) of module 1201; and, (3) every non-destination node in the directed tree $\Psi_t$ has exactly one forwarding neighbor. An MNPF capable node remains at zero flow if its forwarding neighbor in $\Psi_t$ has not yet been added to the permanent set $\mathcal{P}$.

The Physical Model for Calculating the FDAG

The Link Metric Model for calculating the costs of links is discussed above in regard to FIG. 1. While the Link Metric Model can be used in an MNPF setting, it is found that, in high-traffic situations, the Link Bandwidth Model for physically modeling the network in order to compute Optimal FDAGs gives better results in terms of traffic flow. In this model, the bandwidth of every link in the network is specified. In practice, these bandwidths are known for every link. Furthermore, by information exchange, every node in an autonomous routing area has knowledge of the bandwidths of all the links in that area.

Bandwidth is a term synonymous with capacity in communication networks, and is normally given in units of bits-per-second. So long as the packet flow rate on every link is less than its capacity, the network operates smoothly at "line speed". A link is incapable of transmitting packets at a rate greater that the bandwidth. Indeed, if the demand for a link exceeds the operating bandwidth, packets get dropped. With some protocols, e.g. Transfer Control Protocol, the point-to-point throughput decreases because of packet drops.

For any given destination node, the aim of the MNPF forwarding method is to maximize the flow of all traffic destined for that node. However, there are two facts to consider in such a maximization procedure: (1) a non-destination node is unaware of the traffic generated in any other part of the network; and, (2) a non-destination node has to maximize its flow subject to the restrictions imposed by the forwarding proportions of the other non-destination nodes.

Given these two facts, the "best effort" scenario for flow maximization for a non-destination node is this: (1) it assumes that it is the only node transmitting packets to the destination node; (2) no other packet stream has consumed any portion of the bandwidths of the links that it uses to transmit these packets; and, (3) the intermediate nodes that it uses for transmitting these packets use proportional forwarding derived from these same considerations. As explained above in this section, not all the intermediate nodes have to use proportional forwarding. However, packet flow results are sub-optimal in this case.

A Novel and Efficient Routing Table for Non-Uniform Random Neighbor Selection

A proportional forwarding table on the data path of a non-destination network node predetermines a policy by which the node is to forward a proportion of packets destined for a given destination node to a given neighboring node. One example of such a table is given by MNPF. In one embodiment, such a policy is achieved by forwarding packets on a per-packet basis, based upon a random outcome.

If proportional likelihoods in a node's MNPF routing table are relatively uniform for a given destination node entry, a typical method for random selection of a next hop node can be performed within reasonable time and memory requirements. For example, the first operation in a typical decision tree approach is to generate a random number u from a uniform distribution with range [0,1]. If the random number u is compared with uniform proportional likelihoods considered as intervals along a unit line, the next hop decision is made in a relatively few number of decision tree steps.

However, optimal proportions for MNPF routing are rarely uniform. Optimal proportions for forwarding packets via multiple paths to the specified destination node are generally unequal. Consider a node having the six forwarding neighbors A through F with the forwarding probabilities as shown in FIG. 14.

Figures 14, 15:
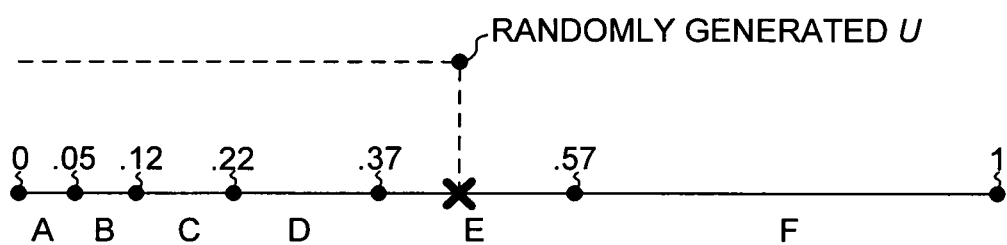
FIG. 14 shows unequal MNPF forwarding probabilities for a node having neighbors A through F.
FIG. 15 illustrates line intervals of probabilities corresponding to the neighboring nodes of FIG. 14, covering a unit line interval.

FIG. 15 illustrates line intervals of probabilities corresponding to these neighbors covering a unit line interval. Then given a random number u, the interval it falls in is decided by a sequence of comparisons. If these comparisons are done left-to-right sequentially in the order shown in FIG. 15, they result in the decision tree 1600 shown in FIG. 16.

Since the random numbers are generated from a uniform distribution, 43% of the time (over a large number of trials) they fall in the interval corresponding to neighboring node F. However in order to make the decision to select neighboring node F, this decision tree has to make five comparisons every time!

In light of the above discussion, a decision tree that minimizes the average number of comparisons at a given node should be pre-computed at every node. In other words, given: 1. A non-destination node x∈N with forwarding neighbor set $H_x \subset N$, and 2. $P_{xy}$—the forwarding probabilities from node x to node y, $\forall y \in H_x$, the optimal decision tree is the one that minimizes $T_x$ the average number of comparisons at x where, $$T_x = \sum_{y \in H_x} P_{xy} T_{xy}$$

and $T_{xy}$ denotes the number of comparisons to decide y.

Figure 16:
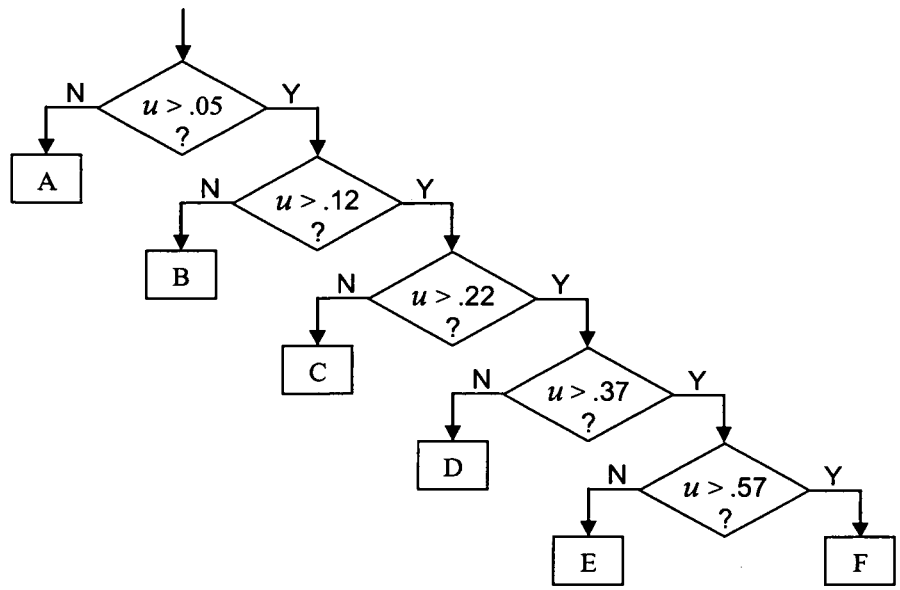
FIG. 16 illustrates a typical decision tree 1600 for randomly determining the next hop based on the unequal MNPF proportions of FIG. 14.
Figure 17:
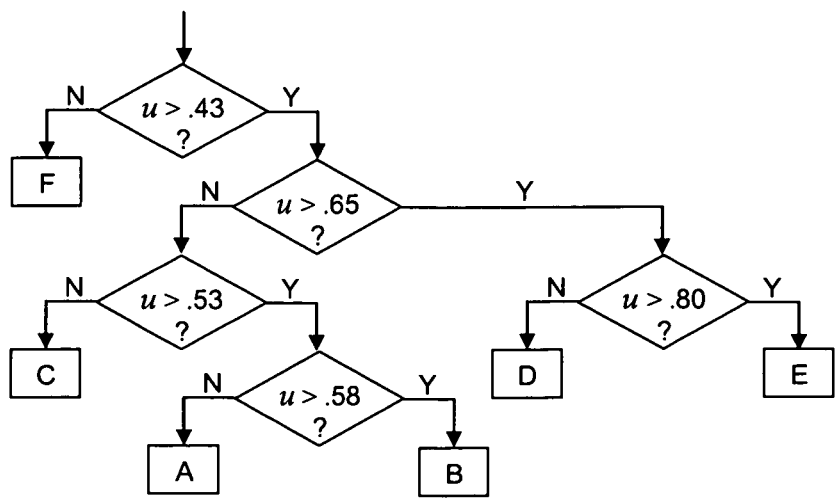
FIG. 17 illustrates an optimal pre-computed decision tree 1700 for randomly determining the next hop based on the unequal MNPF proportions of FIG. 14.

FIG. 17 illustrates an optimal pre-computed decision tree 1700 for randomly determining the next hop based on the unequal MNPF proportions of FIG. 14. For optimal decision tree 1700, the average number of "u>p" comparisons made is 2.26. In comparison, the average number of "u>p" comparisons made using the decision tree of FIG. 16 is 4.24. However, in spite of its elegance and its optimality, the optimal decision tree 1700 has drawbacks, including: 1) Too many "u>p" type comparisons in order to select one next hop neighbor; 2) The associated space (memory) required for storing the optimal decision tree; 3) The time required for setting up the optimal decision tree.

The "Alias" Method described below in the section that follows, has none of these drawbacks. It is therefore the method of choice for random next hop neighbor selection in Multi-Neighbor Proportional Forwarding. The Alias Method builds a variant of the MNPF routing tables for each MNPF capable node. The MNPF routing table variant will be referred to as the Random Neighbor (RN) routing table. Note that the example MNPF routing tables of FIG. 10 and FIG. 11 also allow for random selection of a next hop. What is described with respect to the RN routing table is a variant of the MNPF routing table that allows improved speed of random next hop selection at run time. The RN routing table is a type of MNPF routing table.

An example RN routing table 1800 for node E 705 shown in FIG. 18 has three fields per record—Destination Node 1801, also called the key, Number of Next Hops 1802 for this destination (first part of the rule), and the List of Forwarding Nodes 1803 with thresholds and aliases associated with each of them (second part of the rule). Thresholds may also be referred to as cutoff probabilities. Aliases may also be referred to as alias ID's. For details on the meaning of the terms threshold and alias, the reader is referred to the section that follows on the Alias Method. The RN routing table 1800 uses thresholds and aliases to implement the forwarding proportions shown in FIG. 10.

The "Alias" Method

The Alias method allows the random selection of the next hop neighbor with the correct probabilities in constant-time in the worst case. There is however, a linear setup time and extra linear storage. In fact, our method for the setup phase of this method is in-line (i.e. without any extra memory overhead). The "alias" method for generating discrete random variates is known in the art.

Let x∈N be any non-destination node with a set $H_x$ of m forwarding neighbors. A way to implement this method is to have an array m records R[0 . . . m−1] at node x, each record having a unique forwarding neighbor ID, the probability of forwarding to that neighbor, plus two other pieces of information—the cutoff probability and the alias neighbor ID. The $i^{th}$ record R[i] in the array can thus be viewed as seen in FIG. 19 where $x_i \in H_x$, the cutoff probability $\theta_i \in [0,1]$, and the alias neighbor ID $a_i \in H_x$ is the ID of (usually another) forwarding neighbor.

The Alias Method: Run Phase

Figure 20:
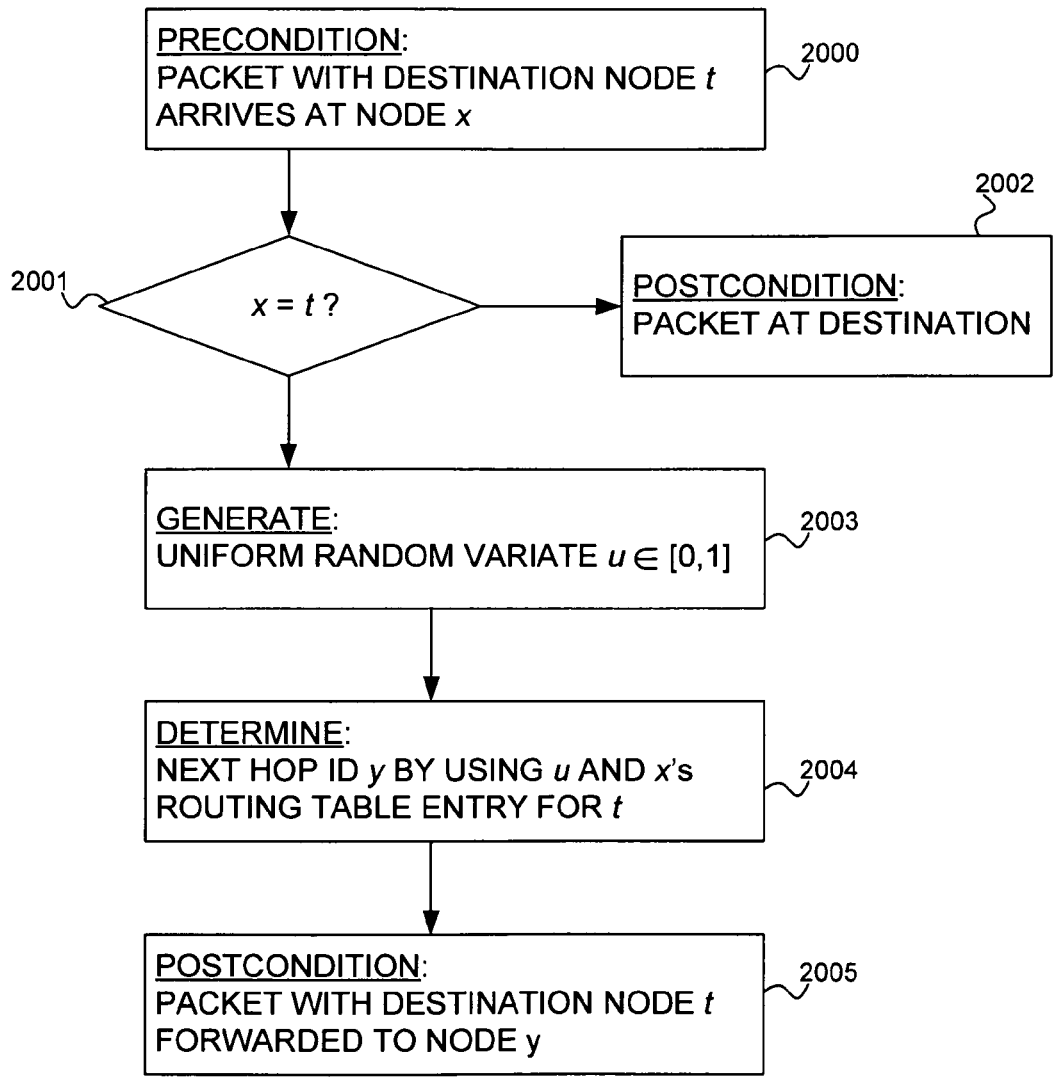
FIG. 20 is a flowchart illustrating the run phase of a node implementing the Alias Method and forwarding a packet according to the node's stored Random Neighbor routing table.

FIG. 20 is a flowchart illustrating the run phase of a node implementing the Alias Method and forwarding a packet according to the node's stored Random Neighbor routing table. In step 2000, a packet destined for a destination router t arrives at node x. In step 2001, the node x determines if the destination node t of the packet is itself. If yes, the packet has arrived at its destination node in step 2002 and the packet does not have to be forwarded according to the node's stored Random Neighbor routing table. If no, the packet is not at its destination node, and so in step 2003 the node generates a uniform random variate u within the set [0,1]. Next, in step 2004, the generated uniform random variate u is used to determine the next hop by reference to the Random Neighbor routing table entry for destination node t. Finally, in step 2005, the packet is forwarded to the determined next hop node y on its path to destination node t.

The simplicity and efficiency of the Alias method is best described by considering the run phase of the method shown in FIG. 21, in which the next hop neighbor is randomly selected. Assume that from the setup phase of this method, the array of records for node x has already been created. Then, given a uniform random variate u from [0,1], the method 2100 shown in FIG. 21 returns the next hop ID for node x.

Note that 2100 is the (only) portion of the step 2004 shown in FIG. 20. Also note that steps 1) and 2) of method 2100 create two independent random variates i and v from the single random variate u. In practice, from a numerical point of view, generating two random numbers may work better. The time complexity of this random selection method 2100 is thus O(1).

We show how this method works on the example of FIG. 14. FIG. 22 shows an array of six records corresponding to this example.

As a check, consider Pr(F)—the probability of selecting neighbor ID F. F occurs as the alias in records 0, 1, and 2, and as the neighbor ID of record 5. Each of these records is chosen uniformly with probability ⅙. Therefore:

$$Pr(F) = \frac{1}{6}\{(1-\theta_0) + (1-\theta_1) + (1-\theta_2) + \theta_5\} =$$

$$\frac{1}{6}\{0.70 + 0.58 + 0.40 + 0.90\} = \frac{2.58}{6} = 0.43$$

This is exactly the forwarding probability for node F in the record array of FIG. 22.

Note that the record array is not unique by any means. FIG. 23 shows another possible record array for the same example. Again computing Pr(F), we get the forwarding probability of F:

$$Pr(F) = \frac{1}{6}\{(1-\theta_0) + (1-\theta_1) + (1-\theta_2) + (1-\theta_3) + \theta_5\}$$

$$= \frac{1}{6}\{0.70 + 0.58 + 0.40 + 0.10 + 0.80\} = \frac{2.58}{6} = 0.43$$

Alias Method: The Setup Phase

In this section, a linear-time in-line method is presented that computes the cutoff probabilities and alias ID's for an RN routing table, given an initial array of MNPF records that does not contain the cutoff probabilities and alias ID's. This setup phase of the "Alias" method 2400 is shown in FIG. 24. The "main" method is provided in procedure AliasSetup in module 2402.

In procedure AliasSetup 2402, the cutoff probabilities in the record array are initialized to m times the corresponding forwarding probability (i.e., $\theta_i \leftarrow m \times p_i$). This operation will (in general) create cutoff probabilities that are greater than 1. Next, AliasSetup 2402 calls Pivot 2401. Pivot 2401 is a function similar to the well-known Quicksort method that partitions records (by exchanging them) with the Cutoff Probability as key, pivoting them around the pivot value of 1, such that all records with cutoff probabilities ≤1 occur to the left of those with cutoff probabilities >1. The Pivot 2401 function also returns the position of the first record with Cutoff Probability. If no such record exists, it returns a position beyond the bounds of the array by executing line number 10) of 2401.

Note that the function Pivot 2401 is a linear-time in-line method that performs the exchange-partition of records by known methods of moving a left pointer l to the right, and moving a right pointer r to the left.

The procedure AliasSetup 2402 is also linear-time because at step 10) of the procedure the pointer i is always incremented to the next record. Furthermore, the entire procedure is in-line without any extra storage requirements. The Alias ID and Cutoff Probability information updating steps of 8) and 9) respectively of 2402 are the most critical steps of the Alias method and constitute the reason this method works.

Figure 25:
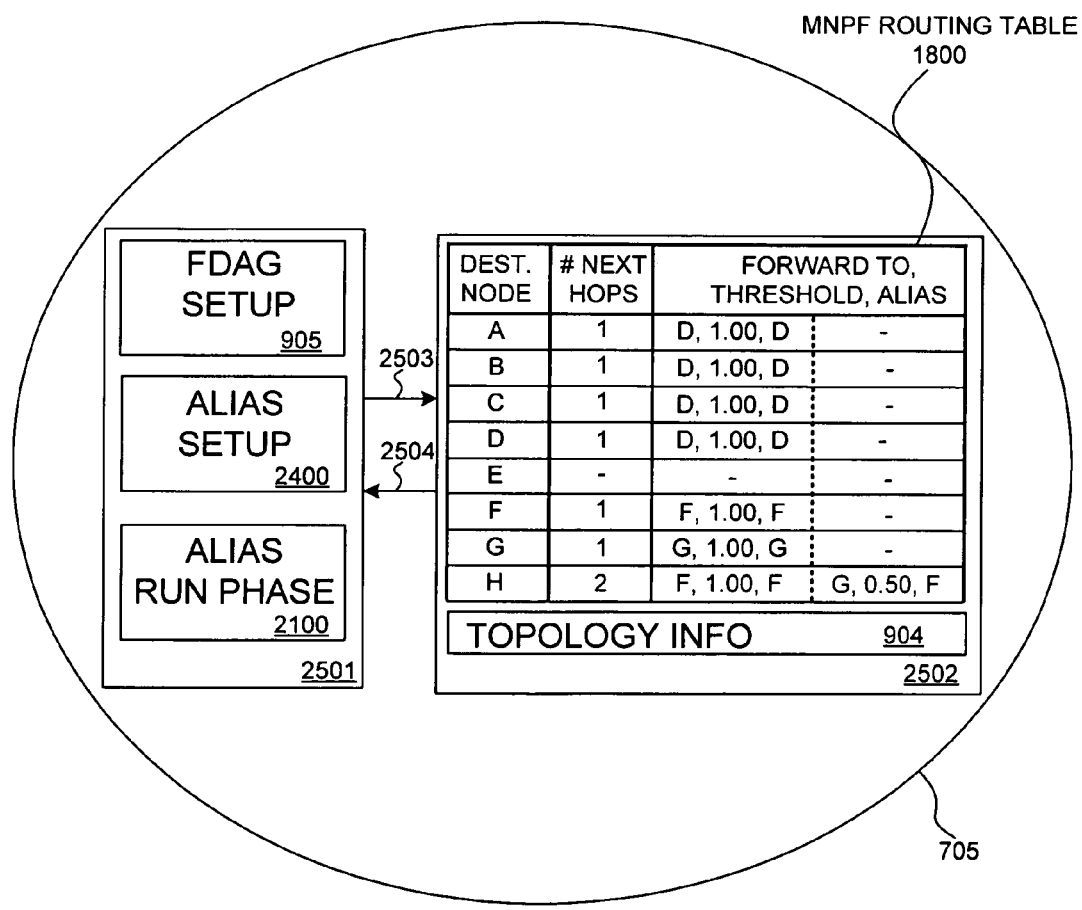
FIG. 25 is a simplified view of a network node implementing the Alias method of MNPF packet routing.

FIG. 25 shows a node 2500 that implements the Alias method of MNPF packet routing. The node 2500 includes a processor 2501 and a memory 2502. Processor 2501 and memory 2502 communicate via buses 2503 and 2504. Memory 2502 stores network topology information 904 according to a well-known protocol such as OSPF or ISIS. An FDAG set-up engine 905 running on the processor 2501 uses the network topology information 904 for computing Optimal FDAGs for each possible destination node of the network.

An engine implementing the Alias setup method 2400 runs on the processor 2501 and uses the forwarding proportions of the computed FDAGs to determine the appropriate Threshold and Alias rules to associate with allowed Forward To nodes for each destination node in a RN routing table 1800 for node 2500. Memory 2502 stores the RN routing table 1800. The Alias Run Phase engine 2100 running on processor 2501 uses the RN routing table 1800 to determine the next hop when an information packet is to be forwarded to another node.

Stream Basis Set Division Multiplexing

Stream Basis Set Division Multiplexing (SBSDM) describes a system and methods for implementing MNPF on existing routers with traditional routing tables, i.e., a routing table in which a single next hop is keyed to a destination address or range of addresses. Exploiting the fact that every node is or can be made to be responsible for a multiplicity of addresses, the present invention achieves close approximation to the optimal paths and proportions prescribed by the MNPF method on a traditional router. Since these addresses are already present in a traditional router's routing table, there is no increase in space. SBSDM consists of an algorithmic engine that generates the rules associated with each address in said table. SBSDM therefore works locally within individual traditional routers in the network. Its effect however is global.

The advantages of this scheme are:

A) SBSDM does not interfere with the data path of the router where fast table look-ups happen. B) While achieving the Multi-Path Routing objectives of congestion avoidance and load balancing, the simple structure of a traditional routing table is retained. Memory space and table look-up time are preserved. C) The concept of packet streams allows packet ordering to be maintained in the network.

Note that while SBSDM is an MNPF scheme, it does not involve random selection of next hop nodes. Rather, two packets with the same destination address always take the same path. However, two packets with different destination addresses served by the same destination node may take different paths. Thus, packets take multiple optimal paths to a destination node, and forwarding of packets by*nodes along these paths approximates MNPF proportions.

Figures 26, 27:
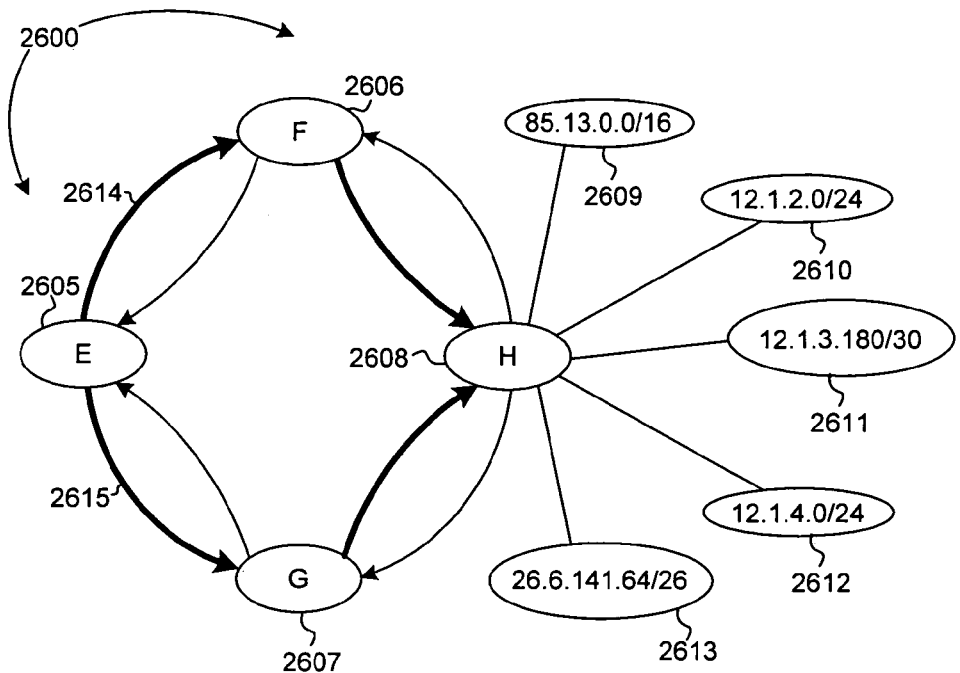
FIG. 26 shows a portion of an FDAG and discrete ranges of addresses served by the destination node of the FDAG, illustrating an aspect of MNPF routing using Stream Basis Set Division Multiplexing (SBSDM).
FIG. 27 shows a portion of a simplified SBSDM routing table.

FIG. 26 shows a portion of an FDAG similar to that of FIG. 7, with MNPF routing of packets from node E 2605 to node H 2608. Node H 2608 is responsible for forwarding those packets onward to a range of addresses via sub-net node 2609, sub-net node 2610, sub-net node 2611, sub-net node 2612, or sub-net node 2613. Node E 2605 forwards 60% of packets destined for node H 2608 to node F 2606 via link 2614, and 40% of packets destined for node H 2608 to node G 2607 via link 2615, according to MNPF routing as shown in the routing table entry 1005 for node H in FIG. 10.

In a router implementing SBSDM, an SBSDM algorithmic engine resides in the control path, isolated from the data path. The SBSDM engine takes the forwarding proportions dictated by MNPF and runs an optimization engine to provide the contents of a traditional routing table such that the MNPF forwarding proportions are approximated.

FIG. 27 shows a portion of a simplified traditional routing table 2700 for node E 2605 with the MNPF forwarding proportions of routing table entry 1005 of FIG. 10 approximated according to SBSDM. The Destination Range column 2701 contains entries for the five sub-nets served by node H 2608. Corresponding Next Hop column 2702 entries show that packets for three of the five ranges of destination addresses are forwarded to node H 2608 via node F 2606. Packets for the other two of the five ranges of destination addresses are forwarded to node H 2608 via node G 2607. The SBSDM algorithmic engine generates the rules associated with each address or range of addresses in the table. FIG. 27 is, therefore, a portion of an SBSDM routing table, which is a type of MNPF routing table.

Thus, assuming approximately equal traffic to each range of addresses, the forwarding proportion of 60% of packets forwarded to node H 2608 via node F 2606 is maintained, and the forwarding proportion of 40% of packets forwarded to node H 2608 via node G 2607 is maintained. Of course, in a real world situation, the ranges of addresses assigned next hop rules may be partitioned such that they do not align perfectly with the address ranges of sub-net routers served by the destination node.

SBSDM provides an approximation to MNPF. Since MNPF can be made to work in networks that contain a mixture of both MNPF enabled and non-MNPF enabled routers, SBSDM works in the same fashion as MNPF in such mixed networks. This fact allows a mixture of routers to co-exist within a network—those that perform SBSDM and those that choose not to.

To understand Stream Basis Set Division Multiplexing engine algorithms, it is necessary to understand the concept of streams.

Definition of a Stream

A stream of packets destined for a particular node is associated with that destination node. A stream of packets is defined to be a sequence of packets sent from a source node that follow a unique path to the destination node associated with the stream. From this definition, it follows that for any stream, the set of paths from all nodes to said stream's destination node is a rooted tree, rooted at that destination node.

Note that traffic destined for a particular node may be composed of different streams. Each such stream while having the same root namely the destination node may have different links in its rooted tree. On the other hand, it is possible for two or more different streams having the same root to have identical rooted trees. This is not a problem so long as the links of any such rooted tree is a subset of the FDAG links for said destination node (see the section entitled "THE CONCEPTS BEHIND APPROXIMATING MNPF WITH SBSDM", below).

It is noteworthy that the entire traffic destined for a particular node is composed of streams. Streams are independent, i.e. an individual packet can be a member of one and only one stream.

Implementation of a Stream: Definition of Stream Basis Sets

The most important characteristic of a stream is that there is a unique path from a source node to its destination node. This implies that packets in a stream will arrive at the stream's destination node in the same order as they were sent from a source node. There are many applications and protocols that work most efficiently when packets arrive in order.

At any non-destination node, one can implement a stream based on the destination address or destination address ranges. In any communication network, a destination node is responsible for a set of destination addresses. Thus, there could be as many streams associated with a destination node as the number of destination addresses that it is responsible for.

For maximum utilization of network capacity, a large number of streams should be associated with the same destination node. In instances where a destination node is responsible for only a few destination addresses, the number of streams associated with a destination node can be increased by using a combination of its destination address and destination port number (if the protocol has a port) or other header bit positions to further subdivide the traffic meant for that particular destination. Note that the packet header contains the destination address or port number or header bit positions.

Thus in general terms, given a destination node t, a stream of packets S associated with t can be implemented by switching based on appropriate bit positions in the headers of those packets. Two streams S and S' both associated with the same destination node t will differ in value in at least one of those bit positions. The entire set of packet header positions and their values that implement all streams that can be associated with destination node t will be called the full stream basis set $\mathcal{B}$ (t) of t. Any stream S associated with destination node t has a unique stream basis b $\in \mathcal{B}$ (t). As a consequence, any set of streams associated with destination node t corresponds to a unique stream basis set $\mathcal{B} \subseteq \mathcal{B}$ (t).

The Concepts Behind Approximating MNPF with SBSDM

The most important characteristic of a stream S is that there is a unique path from every node to its destination node t. This implies that for any stream S, the set of paths from all nodes to its associated destination node t is a rooted spanning tree $T_s$, rooted at t.

On the other hand, MNPF prescribes an FDAG $F_t$, which is a rooted spanning directed acyclic graph rooted at t, for every destination node t. Therefore, SBSDM methods that are required to structurally approximate $F_t$ with streams can do so by maintaining that for every stream S with destination node t, the tree $T_s$ is a subgraph of $F_t$.

Figure 28:
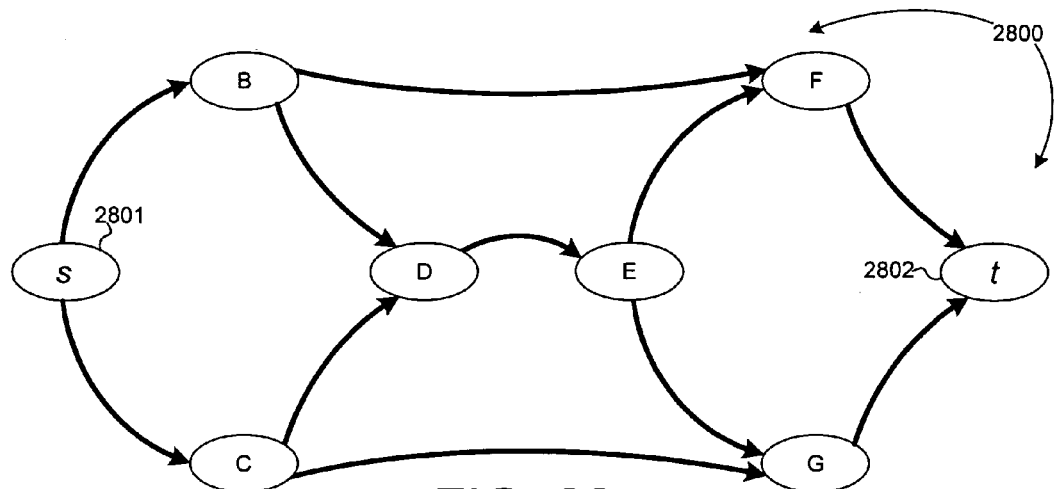
FIG. 28 shows an FDAG with multiple routes to the destination node, illustrating an aspect of SBSDM.

An illustration of this structural requirement is provided in FIG. 28. Example FDAG 2800 shows an FDAG $F_t$ with destination node t 2802, determined by MNPF. This FDAG shows that packets can be routed from source s 2801, to destination t 2802, by following six different paths: s-B-F-t, s-B-D-E-F-t, s-B-D-E-G-t, s-C-D-E-F-t, s-C-D-E-G-t and s-C-G-t.

Figure 29:
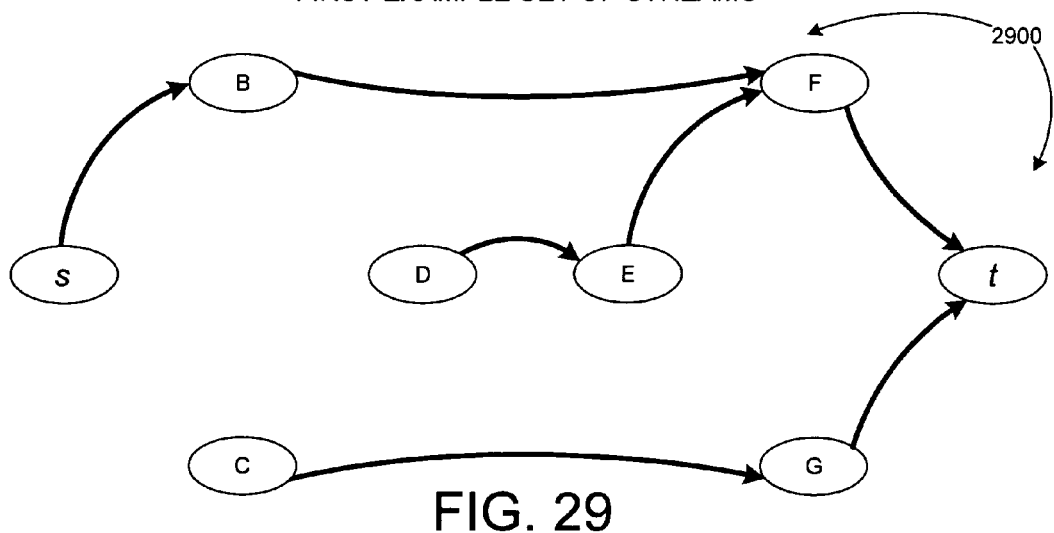
FIG. 29 shows a rooted tree that structurally approximates the FDAG shown in FIG. 28, illustrating the concept of packet streams used in the SBSDM method.

FIG. 29 shows a rooted tree 2900 rooted at t that structurally approximates the FDAG shown in FIG. 28 for streams associated with destination t. Rooted tree 2900 shows that the stream of packets from s to t would follow the unique path s-B-F-t. Similarly, the stream from D to t would follow the unique path D-E-F-t.

Figure 30:
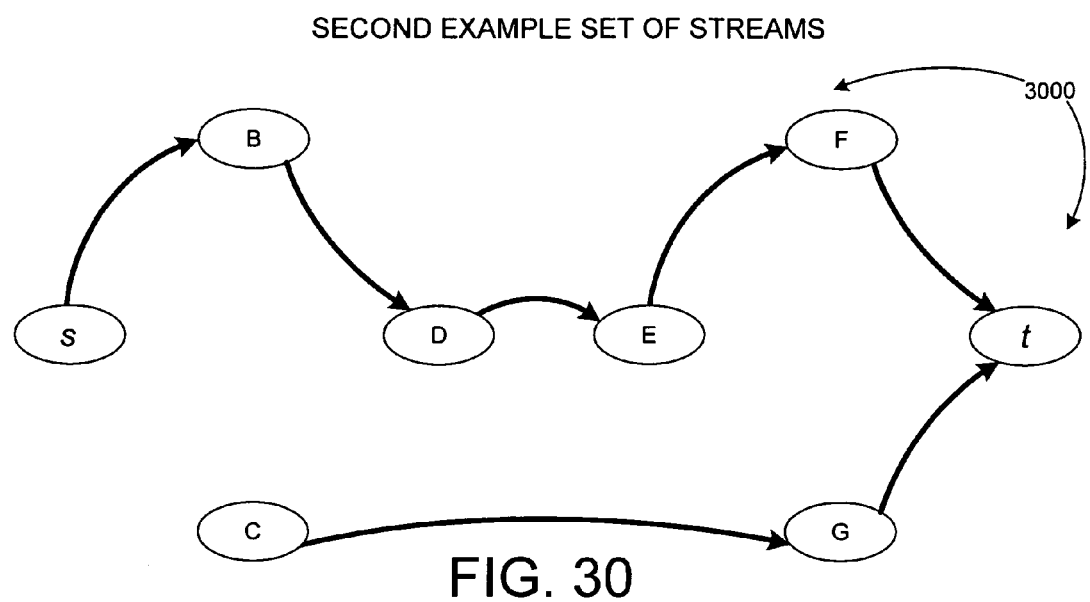
FIG. 30 shows a different rooted tree that structurally approximates the FDAG shown in FIG. 28, illustrating the concept of packet streams used in the SBSDM method.

FIG. 30 shows another rooted tree 3000 rooted at that structurally approximates the FDAG shown in FIG. 28 for streams associated with destination t. Rooted tree 3000 shows that the stream of packets from s to t would follow the path s-B-D-E-F-t, and from C to t would follow the path C-G-t.

MNPF also specifies the optimal proportions at every non-destination node x with which packets destined for node t must be forwarded along the links of FDAG $F_t$. SBSDM methods are required to numerically approximate these optimal proportions using streams. There is obviously a need to establish a correspondence between the concept of proportions in MNPF and a measurable entity in SBSDM. This entity should be related to the number of packets carried by a stream over a finite long time, i.e. the asymptotic number of packets per unit time. A way to approximate MNPF proportions is to introduce the concept of the packet rate of a stream in SBSDM.

The packet rate $\rho(S)$ of a stream S is defined to be the number of packets carried by S per unit time. In this document we shall assume that the packet rate of a stream does not change with time. Also, since any stream S associated with destination node t is implemented by a unique stream basis b$\in \mathcal{B}$ (t), we can define and equate the packet rate $\rho(b)$ of a stream basis b as the packet rate of the corresponding stream S. Finally, we define the packet rate $\rho(\mathcal{B})$ of a stream basis set $\mathcal{B} \subseteq \mathcal{B}$ (t) as $$\rho(\mathcal{B}) \equiv \sum_{b \in \mathcal{B}} \rho(b).$$

SBSDM methods achieve both the structural and the numerical approximations to MNPF with streams in a network of routers. They do so by dividing or partitioning the input stream basis set arriving at every non-destination node into a set of mutually exclusive output stream basis sets—hence the name Stream Basis Set Division Multiplexing. All streams having their stream basis in one of these output stream basis sets are now sent out along exactly one of the forwarding links of said non-destination node.

There are two flavors of SBSDM methods. The simpler of the two is the Batch-Mode method. The more complicated flavor is the Iterative-Mode method.

Batch Mode SBSDM

Let the input set of streams associated with destination node t and arriving at node x≠t, have a stream basis set $\mathcal{B} \subseteq \mathcal{B}$ (t). The batch-mode SBSDM method for destination node t, executing at node x≠t, then works as follows:

It first runs the MNPF method for destination node t. MNPF specifies that x should forward packets destined for t in optimal proportions $\{p_1, \ldots, p_m\}$ to its m neighboring nodes $\{x_1, \ldots, x_m\}$.

The method then partitions the input stream basis set $\mathcal{B}$ into m mutually exclusive output stream basis sets $\{\mathcal{B}_1, \ldots, \mathcal{B}_m\}$ such that for 1≤i≤m, all streams having their stream basis in $\mathcal{B}_i$ are sent along forwarding link x→$x_i$ and the proportion $p_i$ is closely approximated by the ratio $\rho(\mathcal{B}_i)/\rho(\mathcal{B})$. See the section below entitled "APPROXIMATING MNPF PROPORTIONS" for further details on how this may be achieved.

Note that the batch-mode SBSDM method approximates MNPF both structurally and numerically, as defined above in the "THE CONCEPTS BEHIND APPROXIMATING MNPF WITH SBSDM" section. This approximation can also be considered to be a classic quantization problem, since $p_i$ is being quantized. In cases where $|\mathcal{B}|$ is large, such an approximation is quick and easy to implement.

It is necessary for every non-destination node $x \neq t$ to consider the full stream basis set $\mathcal{B}(t)$ of t as its input stream basis set $\mathcal{B}$. This is because x could be receiving a proper subset of $\mathcal{B}(t)$ from its neighbors, and could itself be generating packets destined for t. Also, such a scheme allows every node in the network the freedom to unilaterally implement a new stream for t by using a hitherto unused stream basis $b \in \mathcal{B}(t)$. Besides, it is difficult to foresee what might happen in the future when more nodes that could send their packets to t via x are added to the network. This freedom, whereby each node can independently and unilaterally create its distribution of traffic across various streams, also implies that nodes do not need to share their implementations of streams with other nodes.

As opposed to the iterative-mode SBSDM (see the section below), this method has the advantage that any change in $|\mathcal{B}|$ or equivalently $|\mathcal{B}(t)|$ does not structurally change the FDAG $F_t$. The only change would be to shuffle the output streams assigned to the forwarding links.

Iterative Mode SBSDM

The iterative-mode SBSDM method is more complicated than the batch-mode SBSDM method. While keeping the spirit of the MNPF optimization engine, it modifies it to approximate the parameters at every stage of running the MNPF engine. In contrast, the batch mode approximates the parameters at the end.

The input to the method is: 1) The network represented by the directed graph G=(N,A), where N is the set of nodes and $A \subseteq N \times N$ is the set of links with capacities associated with each of them, and, 2) Destination node $t \in N$.

The MNPF method works on node lists $\mathcal{P}$ (for permanent) and $\mathcal{T}$ (for temporary) of the resulting FDAG $F_t$. At every stage of the method, the invariant $\mathcal{P} \cup \mathcal{T} = N$ is maintained. Initially $\mathcal{P}$ is empty and $\mathcal{T} = N$. Then at each step of the method, a node $u \in \mathcal{T}$ having a greatest flow $\phi_t(u)$ is moved from list $\mathcal{T}$ to list $\mathcal{P}$ until $\mathcal{T}$ is empty. The entire iteration is started by setting $\phi_t(t)$ to $\infty$.

It is therefore evident that the computation of the flow $\phi_t$ is crucial. This is carried out in the GetFlow method of MNPF. Given a non-destination node $x \in \mathcal{T}$ with m neighboring nodes $\{x_1, \ldots, x_m\}$, where $x_i \in \mathcal{P}$ and $(x \to x_i) \in A$ for the GetFlow method computes $\phi_t(x)$. It does this in essence by computing for $1 \leq i \leq m$, the maximum flow $\phi_i$ along forwarding link $x \to x_i$ and finally setting $$\phi_t(x) = \sum_{i=1}^{m} \varphi_i.$$

The MNPF proportion $p_i$ along link $x \to x_i$ is computed by $\phi_i / \phi_t(x)$.

The iterative-mode SBSDM recognizes the fact that these MNPF proportions can only be approximated by streams using the methods described in the "APPROXIMATING MNPF PROPORTIONS" section that follows. Thus, instead of using the proportion $p_i$ along link $x \to x_i$ for $1 \leq i \leq m$ as computed by the GetFlow method, it modifies $p_i$ to the approximation $p_i'$ given by methods described in the following section. It is clear that the resulting FDAG $F_t'$ arising from repeated application of these approximations at every step of the above method may not equal to $F_t$—that obtained by the "pure" MNPF method.

Note that the iterative-mode SBSDM method approximates MNPF both structurally and numerically, as defined in the section above entitled "THE CONCEPTS BEHIND APPROXIMATING MNPF WITH SBSDM". As opposed to the batch-mode SBSDM method, even the structure of MNPF is approximated such that an approximate FDAG $F_t'$ is obtained.

The iterative-mode SBSDM method may perform better than the batch-mode method because it is more tuned to the application. On the other hand, the iterative-mode method has the disadvantage that any change in $\mathcal{B}(t)$ structurally changes the resulting approximate FDAG $F_t'$. It can therefore be used only when $\mathcal{B}(t)$ is reasonably stable.

As in the batch-mode SBSDM method, each node in the iterative-mode SBSDM method can independently and unilaterally create its distribution of traffic across various streams. Thus, nodes in the iterative-mode SBSDM method also do not need to share their implementations of streams with other nodes.

Approximating MNPF Proportions

Let $\mathcal{B} \subseteq \mathcal{B}(t)$ be the input stream basis set for destination node t, arriving at node $x \neq t$. Proportions $\{p_1, \ldots, p_m\}$ on the m forwarding links are specified apriori. The problem is to find a partition of $\mathcal{B}$ into m mutually exclusive output stream basis sets $\{\mathcal{B}_1, \ldots, \mathcal{B}_m\}$ such that for $1 \leq i \leq m$ the ratio $\rho(\mathcal{B}_i)/\rho(\mathcal{B})$ closely approximates $p_i$.

Let $\mathcal{B} = \{b_1, \ldots, b_s\}$ where the b's represent the individual stream bases for t and let $w_i = \rho(b_i)/\rho(\mathcal{B})$ be defined as the normalized packet rate of stream basis $b_i$ for $1 \leq i \leq s$. Then this problem reduces to the following partitioning problem:

Given a set of s positive real numbers $\omega \equiv \{w_1, \ldots, w_s\}$ with $$\sum_{i=1}^{s} w_i = 1,$$

and m positive real numbers $\{p_1, \ldots, p_m\}$ with $$\sum_{i=1}^{m} p_i = 1,$$

to determine a partition of $\omega$ into m (mutually exclusive) sets $\{\omega_1, \ldots, \omega_m\}$ such that for $1 \leq i \leq m$, the sum $r_i$ of the w's in set $\omega_i$ is $$r_i \equiv \sum_{w \in W_i} w \approx p_i.$$

One way to formulate this approximation problem is to think in terms of discrete probability distributions. In that case, one seeks the partition such that the K-L divergence of the probability distribution of the partitions $\{r_1, \ldots, r_m\}$ from the given probability distribution $\{p_1, \ldots, p_m\}$ is minimized. That is, $$\sum_{i=1}^{m} p_i \log \frac{p_i}{r_i}$$

is minimized. Numerous other formulations are also possible.

Unfortunately, this is an NP-Hard problem in general. For the case of m=2 and $p_1=p_2=0.5$, the decision theoretic problem of deciding whether ω can be partitioned into 2 parts such that $r_1=r_2=0.5$ is NP-Complete. However, approximate and pseudo polynomial time methods are available for our use.

A Special Case: Maximum Likelihood Approach

If the packet rates of the stream bases are unknown, one can distribute the s stream bases $b_1, \ldots, b_s$ randomly among the m forwarding links with proportions $p_1, \ldots, p_m$. Then the probability $Pr(s_1, \ldots, s_m)$ that $s_i$ stream bases are forwarded along the $i^{th}$ link for $1 \leq i \leq m$ is given by the multinomial distribution:

$$\binom{s}{s_1, \ldots, s_m} p_1^{s_1} \times \ldots \times p_m^{s_m}.$$

One way to obtain the best set of values for $s_1, \ldots, s_m$ is to find those values that maximize the probability $Pr(s_1, \ldots, s_m)$. Known approaches provide a $O(m^2)$ time solution to this problem.

Figure 31:
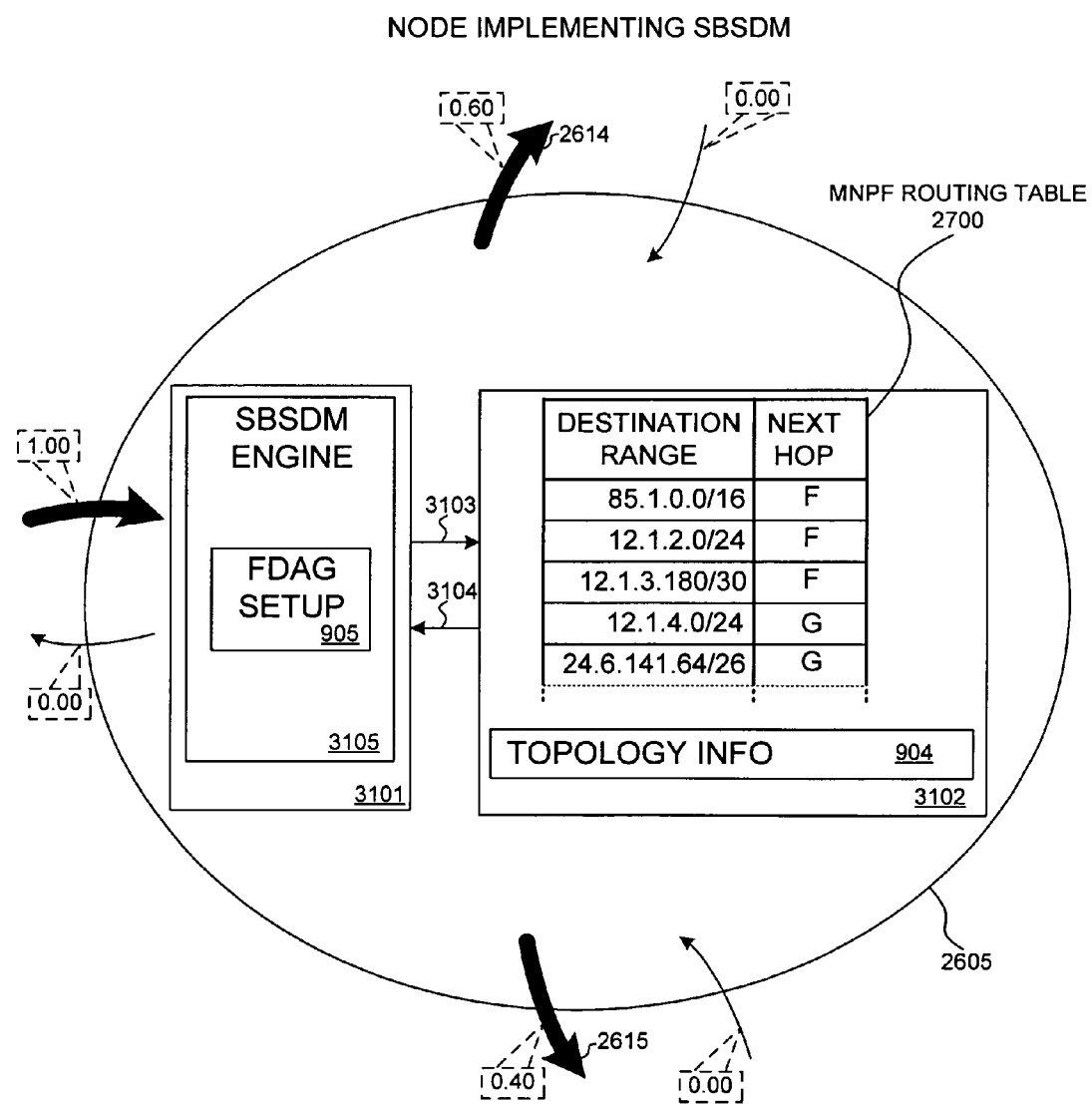
FIG. 31 is a simplified view of a node in a network of nodes implementing SBSDM.

FIG. 31 is a simplified view of node E 2605 of FIG. 26 illustrating one embodiment. Node E 2605 includes a processor 900 and a memory 901. Processor 3101 and memory 3102 communicate via buses 3103 and 3104. Memory 3102 stores network topology information 904 according to a well-known protocol such as OSPF or ISIS. An FDAG set-up engine 905 running on the processor 3101 uses the network topology information 904 for computing Optimal FDAGs for each possible destination node of the network. The FDAG set-up engine 905 uses the computed FDAGs to determine the appropriate forwarding proportions for each destination node. Note that in this case, the FDAG set-up engine 905 runs as a sub-routine of the SBSDM engine 3105.

The SBSDM engine 3105 constructs an SBSDM routing table 2700 that approximates the MNPF forwarding proportions. The SBSDM routing table 2700 for the node 2605 is stored in memory 3102 for later use in forwarding of an information packet to its destination. Thus, approximately 600 of packets forwarded from node E 2605 destined for node H 2608 are forwarded via link 2614 to node F 2606, while approximately 40% of packets forwarded from node E 2605 destined for node H 2608 are forwarded via link 2615 to node G 2607.

Other MNPF capable nodes in the network each run their own instance of the FDAG set-up engine 905 to determine their own MNPF routing tables. These MNPF capable nodes can run other variants of MNPF, such as the Alias method and its accompanying RN routing table, described above. Note that SBSDM methods can be run on a subset of SBSDM capable routers, in which case these routers determine routing tables for other SBSDM capable routers.

Although Multi-Neighbor Proportional Forwarding is described above in connection with an embodiment in which a network router determines optimal paths and proportional forwarding parameters, in another embodiment computing optimal FDAGs for destination nodes and determining MNPF routing table entries for network nodes is performed by a computing device other than one of the network routers, such as a laptop computer. The computing device can be connected to the network and assign, via its connection to the network, the appropriate MNPF routing table to each node that implements the MNPF routing method. Also, note that the routing tables can be transferred from the computing device other than by network connection; for example, an MNPF routing table could be transferred to the appropriate node physically, using a storage device such as a disk or Flash drive. More than one computing device could be used to compute some routing tables. Additionally, although maximizing the flow rate of packets to determine optimal paths and proportional forwarding parameters is described, variant methods may be employed to determine MNPF parameters for forwarding packets along multiple acyclic paths to destination nodes. Accordingly, various modifications, adaptations, and combinations of various features of the described embodiments can be practiced without departing from the scope of the invention as set forth in the claims.

What is claimed is:

1. A method involving a network of nodes, wherein the network of nodes includes a first node and a second node, wherein the second node serves both a first range of IP destination addresses and a second range of IP destination addresses, the method comprising:
    (a) receiving Multi-Neighbor Proportional Forwarding (MNPF) forwarding proportions onto the first node; and
    (b) storing on the first node a routing table for the first node, wherein the routing table identifies for each IP destination address one and no more than one next hop to which an IP packet having said each IP destination address is to be forwarded from the first node as a result of one and no more than one look-up on the routing table, wherein the routing table identifies one and no more than one next hop for each IP destination address in the first range of IP destination addresses, wherein the routing table identifies one and no more than one next hop for each IP destination address in the second range of IP destination addresses, and wherein each next hop is determined using the MNPF proportions received in (a).

2. The method of claim 1, wherein the using of the MNPF forwarding proportions to determine a next hop involves determining a first hop for the first range of IP destination addresses and involves determining a second hop for the second range of IP destination addresses.

3. The method of claim 1, further comprising:
    (c) monitoring packet traffic through the first node; and
    (d) based at least in part on said monitoring changing the routing table such that the MNPF forwarding proportions are better approximated.

4. The method of claim 1, further comprising:
    (c) receiving a first packet onto the first node, wherein the first packet has an IP destination address in the first range of IP destination addresses;
    (d) routing the first packet according to the routing table from the first node to the second node via a first hop;
    (e) receiving a second packet onto the first node, wherein the second packet has an IP destination address in the second range of IP destination addresses; and
    (f) routing the second packet according to the routing table from the first node to the second node via a second hop.

5. The method of claim 4, wherein a forwarding of an IP packet from the first node to the second node via the first hop has an unequal cost as compared to a forwarding of the IP packet from the first node to the second node via the second hop.

6. The method of claim 4, further comprising:
(g) monitoring packet traffic through the first node and thereby determining a proportion of traffic that passes from the first node to the first hop as compared to traffic that passes from the first node to the second hop; and
(h) based on the determined proportion changing the routing table such that the first range of addresses is a larger range of addresses and such that the second range of addresses is a smaller range of addresses.

7. An apparatus, comprising:
a computer-readable medium that stores a routing table for the apparatus, wherein the routing table identifies for each IP destination address one and no more than one next hop to which an IP packet having said each IP destination address is to be forwarded from the apparatus as a result of one and no more than one look-up on the routing table, wherein the routing table identifies one and no more than one next hop for each IP destination address in a first range of IP destination addresses, wherein the routing table identifies one and no more than one next hop for each IP destination address in a second range of IP destination addresses, wherein each next hop is determined using Multi-Neighbor Proportional Forwarding (MNPF) proportions, and wherein both the first range of IP destination addresses and the second range of IP destination addresses are served by a node; and
a processor that causes the apparatus to receive the MNPF proportions, and to route a first IP packet according to the routing table from the apparatus to the node via a first hop, wherein the first IP packet has an IP destination address in the first range of IP destination addresses, wherein the processor also causes the apparatus to route a second IP packet according to the routing table from the apparatus to the node via a second hop, and wherein the second IP packet has an IP destination address in the second range of IP destination addresses.

8. The apparatus of claim 7, wherein a forwarding of an IP packet from the apparatus to the node via the first hop has an unequal cost as compared to a forwarding of the IP packet from the apparatus to the node via the second hop.

9. The apparatus of claim 7, wherein the processor uses the MNPF forwarding proportions to determine a next hop for each of a plurality of address ranges such that the MNPF forwarding proportions are approximated, and wherein the using of the MNPF forwarding proportions to determine a next hop involves determining the first hop for the first range of IP destination addresses and involves determining the second hop for the second range of IP destination addresses.

10. The apparatus of claim 7, wherein the processor monitors packet traffic through the apparatus and thereby determines a proportion of traffic that passes from the apparatus to the first hop as compared to traffic that passes from the apparatus to the second hop, and wherein the processor changes the routing table based at least in part on information obtained by said monitoring of packet traffic.

11. The apparatus of claim 7, wherein the processor monitors packet traffic through the apparatus, and based at least in part on said monitoring changes the routing table such that the MNPF forwarding proportions are better approximated.

12. The apparatus of claim 7, wherein the one and no more than one look-up on the routing table is accessing an IP destination address in the routing table one and only one time.

13. An apparatus for operation in a network of nodes, wherein the network of nodes includes the apparatus and node, wherein the node serves both a first range of IP destination addresses and a second range of IP destination addresses, the apparatus comprising:
a memory that stores a routing table, wherein the routing table identifies for each IP destination address one and no more than one next hop to which an IP packet having said each IP destination address is to be forwarded from the apparatus as a result of one and no more than one look-up on the routing table, wherein the routing table identifies one and no more than one next hop for each IP destination address in the first range of IP destination addresses, wherein the routing table identifies one and no more than one next hop for each IP destination address in the second range of IP destination addresses, and wherein each next hop is determined using Multi-Neighbor Proportional Forwarding (MNPF) proportions; and
means for: 1) receiving the MNPF forwarding proportions onto the apparatus, 2) receiving a first IP packet onto the apparatus, wherein the first IP packet has an IP destination address in the first range of IP destination addresses, 3) routing the first IP packet according to the routing table from the first node to the second node via a first hop, 4) receiving a second IP packet onto the apparatus, wherein the second IP packet has an IP destination address in the second range of IP destination addresses; and 5) routing the second IP packet according to the routing table from the apparatus to the second node via a second hop.

14. The apparatus of claim 13, wherein the means is also for: 6) monitoring packet traffic through the apparatus and thereby obtaining information, and 7) changing the routing table based at least in part on said information such that the MNPF forwarding proportions are better approximated.

15. The apparatus of claim 13, wherein the using of the MNPF forwarding proportions to determine a next hop involves determining the first hop for the first range of IP destination addresses and involves determining the second hop for the second range of IP destination addresses.

16. The apparatus of claim 13, wherein the apparatus is a router, and wherein the means comprises a processor.

17. The apparatus of claim 13, wherein the one and no more than one look-up on the routing table is accessing an IP destination address in the routing table one and only one time.

18. An apparatus for operation with a node in a network of nodes, the apparatus comprising:
a memory that stores a routing table, wherein the routing table identifies for each IP destination address one and no more than one next hop to which an IP packet having said each IP destination address is to be forwarded from the apparatus as a result of one and no more than one look-up on the routing table, wherein the routing table identifies one and no more than one next hop for each IP destination address in a first range of IP destination addresses, wherein the routing table identifies one and no more than one next hop for each IP destination address in a second range of IP destination addresses, and wherein each next hop is determined using Multi-Neighbor Proportional Forwarding (MNPF) proportions; and
means for controlling the apparatus such that: 1) the MNPF forwarding proportions are received onto the apparatus, 2) a first IP packet is routed according to the routing table from the apparatus to the node via a first hop, wherein the first IP packet has an IP destination address in the first range of IP destination addresses, and 3) a second IP packet is routed according to the routing table from the apparatus to the node via a second hop, wherein the second IP packet has an IP destination address in the second range of IP destination addresses.

19. The apparatus of claim 18, wherein the means is also for: 4) monitoring packet traffic through the apparatus and thereby obtaining information, and 5) changing the routing table based at least in part on said information such that the MNPF forwarding proportions are better approximated.

20. The apparatus of claim 18, wherein the using of the MNPF forwarding proportions to determine a next hop involves determining the first hop for the first range of IP destination addresses and involves determining the second hop for the second range of IP destination addresses.

21. The apparatus of claim 18, wherein the one and no more than one look-up on the routing table is accessing an IP destination address in the routing table one and only one time.

\* \* \* \* \*